(12) United States Patent
Hanada et al.

(10) Patent No.: US 11,621,093 B2
(45) Date of Patent: Apr. 4, 2023

(54) NUCLEAR-POWER-PLANT COMPUTER-BASED PROCEDURE DISPLAY DEVICE, SAFETY CONTROL AND MONITORING SYSTEM, AND PLANT OPERATION MONITORING SYSTEM

(71) Applicant: MITSUBISHI HEAVY INDUSTRIES, LTD., Tokyo (JP)

(72) Inventors: Satoshi Hanada, Tokyo (JP); Kenji Mashio, Tokyo (JP)

(73) Assignee: MITSUBISHI HEAVY INDUSTRIES, LTD, Tokyo (JP)

( * ) Notice: Subject to any disclaimer, the term of this patent is extended or adjusted under 35 U.S.C. 154(b) by 0 days.

(21) Appl. No.: 17/590,555

(22) Filed: Feb. 1, 2022

(65) Prior Publication Data

US 2022/0157480 A1 May 19, 2022

Related U.S. Application Data

(62) Division of application No. 15/739,904, filed as application No. PCT/JP2016/067128 on Jun. 8, 2016, now Pat. No. 11,289,224.

(30) Foreign Application Priority Data

Aug. 19, 2015 (JP) .............................. JP2015-162321

(51) Int. Cl.
*G21D 3/00* (2006.01)
*G21D 3/04* (2006.01)
(Continued)

(52) U.S. Cl.
CPC ............. *G21D 3/008* (2013.01); *G21C 17/00* (2013.01); *G21D 3/001* (2013.01); *G21D 3/04* (2013.01);
(Continued)

(58) Field of Classification Search
CPC .......... G21D 3/008; G21D 3/001; G21D 3/04; G21D 3/02; G21D 3/06; G21D 3/08
(Continued)

(56) References Cited

U.S. PATENT DOCUMENTS 4,421,716 A 12/1983 Hench et al.
4,552,718 A 11/1985 Impink, Jr. et al.
(Continued)

FOREIGN PATENT DOCUMENTS

JP S59-22105 A 2/1984
JP S60-205397 A 10/1985
(Continued)

OTHER PUBLICATIONS

Fumio Murata et al., "Development of instruction system for BWR—Computerized operator support system", Hitachi Hyoron, Dec. 1985, vol. 67, No. 12, pp. 79-84.
(Continued)

*Primary Examiner* — Darlene M Ritchie
(74) *Attorney, Agent, or Firm* — WHDA, LLP

(57) ABSTRACT

A nuclear-power-plant computer-based procedure display device is disposed in a main control room of a nuclear power plant, and includes a operating procedure storage unit that stores a computer-based procedure in which plant operation procedures of the nuclear power plant are divided into procedure steps and listed, a operating procedure display unit that displays the computer-based procedure, and a operating procedure display control unit that controls display of the computer-based procedure. In a case where the procedure step displayed on the operating procedure display unit is selected by an operator, the operating procedure display control unit displays an indication that the procedure step is selected, on the operating procedure display unit.

2 Claims, 23 Drawing Sheets

(51) Int. Cl.
*G21C 17/00* (2006.01)
*G05B 23/02* (2006.01)
*G05B 9/03* (2006.01)

(52) U.S. Cl.
CPC .............. *G05B 9/03* (2013.01); *G05B 23/02* (2013.01); *Y02E 30/30* (2013.01)

(58) Field of Classification Search
USPC .............................. 376/245–259, 277–307
See application file for complete search history.

(56) References Cited

U.S. PATENT DOCUMENTS

| | | | |
|---|---|---|---|
| 4,815,014 A * | 3/1989 | Lipner | G21C 17/00 700/83 |
| 4,853,175 A | 8/1989 | Book, Sr. | |
| 5,089,978 A * | 2/1992 | Lipner | G21D 3/04 700/83 |
| 5,287,390 A | 2/1994 | Scarola et al. | |
| 5,375,150 A | 12/1994 | Scarola et al. | |
| 5,519,740 A | 5/1996 | Chao | |
| 5,715,178 A * | 2/1998 | Scarola | G21C 17/00 702/116 |
| 5,859,885 A * | 1/1999 | Rusnica | G21D 3/04 340/525 |
| 7,813,817 B2 | 10/2010 | Lipner et al. | |
| 9,070,266 B2 | 6/2015 | Shigeyama et al. | |
| 2007/0270980 A1 | 11/2007 | Lipner et al. | |
| 2013/0129030 A1 | 5/2013 | Hanada et al. | |
| 2013/0271287 A1 | 10/2013 | Shigeyama et al. | |
| 2015/0049851 A1 | 2/2015 | Yokoyama | |

FOREIGN PATENT DOCUMENTS

| | | |
|---|---|---|
| JP | S62-170994 A | 7/1987 |
| JP | H08-220280 A | 8/1996 |
| JP | H10-160894 A | 6/1998 |
| JP | 2009-537900 A | 10/2009 |
| JP | 2011-209127 A | 10/2011 |
| JP | 2012-0033117 A | 2/2012 |
| JP | 2012-128674 A | 7/2012 |
| JP | 2013-200838 A | 10/2013 |

OTHER PUBLICATIONS

Yuji Niwa et al., "Study on Computerized Presentation of Emergency Operating Procedures of Nuclear Plant (Step 3)—The Implementation of the Prototype System and its Evaluations by Users-" INSS Journal, 1996, vol. 3, pp. 216-229.

"Kashiwazaki Kariwa Genshiryoku Hatsudensho 6 Go Oyobi 7 Goro Gososa no Boshi ni Tsuite", The Tokyo Electric Power Co., Inc., Jun. 2015, 64 pages, <http://www.tepco.co.jp/solution/power_equipment/nuclear_power/pdf/nuclear_power_150219_01.pdf>.

Genshiryoku Arszen Taisakuka, "Tsuruga Hatsudensho 3, 4 Goki no Anzensei no Kakunin ni Tsuite" Jun. 13, 2002, 29 pages <http://www.atom.pref.fukui.jp/turu34/>.

International Search Report dated Sep. 6, 2016, issued in counterpart International Application No. PCT/JP2016/067128, with English translation (6 pages).

Written Opinion dated Jun. 9, 2016, issued in counterpart Application No. PCT/JP2016/067128, with English Translation (11 pages).

Office Action dated Aug. 4, 2020, issued in counterpart JP Application No. 2019-144023, with English machine translation.(5 pages).

* cited by examiner

NUCLEAR-POWER-PLANT COMPUTER-BASED PROCEDURE DISPLAY DEVICE, SAFETY CONTROL AND MONITORING SYSTEM, AND PLANT OPERATION MONITORING SYSTEM

CROSS-REFERENCE TO RELATED APPLICATION

The present application is a Divisional of U.S. patent application Ser. No. 15/739,904, filed on Dec. 26, 2017, which is a national stage application filed under 35 USC 371 of International Application No. PCT/JP2016/067128, filed Jun. 8, 2016, and which is based upon and claims the benefit of priority from the prior Japan Patent Application No. 2015-162321, filed on Aug. 19, 2015, the entire contents of which are incorporated herein by reference.

TECHNICAL FIELD

The present invention relates to a nuclear-power-plant computer-based procedure display device, a nuclear-power-plant safety control and monitoring system, and a nuclear-power-plant operation monitoring system.

BACKGROUND ART

In order to operate a nuclear power plant stably, a plant operation monitoring system that is highly reliable and easy to operate is required. In order to realize such a plant operation monitoring system, the application of a soft operation type central control panel and digitization of a control apparatus and a safety facility are in progress. In the plant operation monitoring system in the nuclear power plant, a central control panel is provided on which operators monitor the operation of the plant, workers who operate and monitor the central control panel are located therein, and a supervisor is located in the rear of the plurality of operators. Each worker secures the safe operation of the nuclear power plant by conducting reliable monitoring and operation under various commands and instructions from the supervisor. As a nuclear-power-plant operation monitoring system, there is one described in PTL 1 below.

CITATION LIST

Patent Literature

[PTL 1] Japanese Unexamined Patent Application Publication No. 2012-33117

SUMMARY OF INVENTION

Technical Problem

However, such a plant operation monitoring system needs to be improved to reduce a burden of monitoring on the worker.

Accordingly, an object of the present invention is to provide a nuclear-power-plant computer-based procedure display device, a nuclear-power-plant safety control and monitoring system, and a nuclear-power-plant operation monitoring system, which reduces the burden of monitoring on a worker.

Solution to Problem

In order to solve the above-mentioned problems and achieve the object, a nuclear-power-plant safety control and monitoring system of the present invention is a nuclear-power-plant computer-based procedure display device which is disposed in a main control room of a nuclear power plant, and includes a operating procedure storage unit that stores a computer-based procedure in which plant operation procedures of the nuclear power plant are divided into procedure steps and listed, a operating procedure display unit that displays the computer-based procedure, and a operating procedure display control unit that controls display of the computer-based procedure, wherein in a case where the procedure step displayed on the operating procedure display unit is selected by an operator, the operating procedure display control unit displays an indication that the procedure step is selected, on the operating procedure display unit.

According to the computer-based procedure display device, the worker can check the progress status of the procedure step, from the display on the operating procedure display unit, while performing the plant operation of the nuclear power plant according to the display of the computer-based procedure. Therefore, according to the computer-based procedure display device, it is possible to reduce the burden of monitoring and work burden on the worker.

In the nuclear-power-plant computer-based procedure display device, it is preferable that in a case where selection of the procedure step is detected, the operating procedure display control unit displays an indication that the procedure described in the procedure step has been executed, as the indication that the procedure step is selected, on the operating procedure display unit. According to the computer-based procedure display device, it is possible to suppress an erroneous operation in the plant operation of the nuclear power plant by checking the display, thereby reducing the burden of monitoring and work burden.

In the nuclear-power-plant computer-based procedure display device, it is preferable that the operating procedure display control unit displays a parameter of the nuclear power plant related to the procedure step in association with the procedure step, on the operating procedure display unit. According to the computer-based procedure display device, it is possible to suppress an erroneous operation in the plant operation of the nuclear power plant by checking the display, thereby reducing the burden of monitoring and work burden.

In the nuclear-power-plant computer-based procedure display device, it is preferable that the operating procedure display control unit specifies the operator who selects the procedure step, and stores information on the operator who selects the procedure step in association with the selected procedure step, in the operating procedure storage unit. According to the computer-based procedure display device, it is possible to check the work history, thereby reducing the burden of monitoring in the plant operation of the nuclear power plant.

In the nuclear-power-plant computer-based procedure display device, it is preferable that the operating procedure display unit is a touch panel having the procedure step display area in which the procedure step is displayed, and in a case where the procedure step display area is touched by the operator, the operating procedure display control unit displays an indication that the procedure step displayed in the procedure step display area is selected, by changing the color of the procedure step display area which is touched. According to the computer-based procedure display device, the progress situation is unlikely to be erroneously visually recognized, and thus it is possible to reduce the burden of monitoring in the plant operation of the nuclear power plant.

It is preferable that the nuclear-power-plant computer-based procedure display device includes a plurality of the operating procedure display units each of which displays the computer-based procedure of the same content, and in a case where the procedure step displayed on any of the operating procedure display units is selected, the operating procedure display control unit displays an indication that the procedure step is selected, on other operating procedure display units.

In order to solve the above-mentioned problems and achieve the object, a nuclear-power-plant safety control and monitoring system of the present invention is a nuclear-power-plant safety control and monitoring system which is disposed in a main control room of a nuclear power plant including a plurality of safety devices which are used when abnormality occurs, and have the same function as each other, including a parallel parameter monitor control unit that displays safety parameters which are the parameters of the safety device, for each type of the safety parameters and for each of the plurality of safety devices, side by side; and a task-based parameter monitor control unit that displays the safety parameters, for each step of an emergency operation procedure which is a procedure for leading to a safe state and for each of the plurality of safety devices, side by side.

According to the safety control and monitoring system, the task-based parameter monitor control unit is used when the emergency procedure is executed, and the parallel parameter monitor control unit is used when control other than the emergency operation procedure is performed, so it is possible to reduce the burden of monitoring in both cases.

It is preferable that the nuclear-power-plant safety control and monitoring system further includes a safety parameter monitor device including the task-based parameter monitor control unit, and a safety parameter display unit that displays the safety parameters under the control of the task-based parameter monitor control unit, and a safety control device including a task-based control unit that controls the operation of each unit of the safety device when executing the emergency operation procedure, in which the task-based parameter monitor control unit displays parameters of a safety device related to a procedure step of an emergency operation procedure executed by the task-based control unit as the safety parameters, on the safety parameter display unit. According to the safety control and monitoring system, when the emergency procedure is executed, the emergency operation procedure is executed by the safety control device while the parameter is monitored using the safety parameter monitor device, so it is possible to reduce the burden of monitoring the safety parameter on the worker.

In order to solve the above-mentioned problems and achieve the object, a nuclear-power-plant operation monitoring system of the present invention is a nuclear-power-plant operation monitoring system which is disposed in a main control room of a nuclear power plant, including a display panel which is disposed at a position visible to all workers in the main control room, and displays a main parameter image which is a display of the main parameters of the nuclear power plant is associated with the positions in the nuclear power plant, and an abnormal parameter image which is a display of an abnormal parameter of which the value is abnormal, out of the main parameters; and a non-safety control device including a non-safety control unit that controls the operation of the nuclear power plant based on the operation of the worker, and a non-safety control display unit that displays an image under the control of the non-safety control unit, in which the non-safety control unit displays an initial window including the main parameter image and the abnormal parameter image, on the non-safety control display unit, in conjunction with the display on the display panel, and activates a control program of the nuclear power plant related to the abnormal parameter, in a case where the display of the abnormal parameter is selected by the worker.

According to the plant operation monitoring system, it is possible to activate the related control program by simply selecting the display of the abnormal parameter, on the screen of the initial window of the non-safety control device. Therefore, according to the plant operation monitoring system, the burden of monitoring on the worker can be reduced.

In the nuclear-power-plant operation monitoring system, it is preferable that in a case where the abnormal parameter, to which a plurality of the control programs are related, is selected in the initial window, the non-safety control unit displays a program selection window that displays the plurality of control programs on the non-safety control display unit, and in a case where display of one control program is selected in the program selection window, the selected program is activated. According to the plant operation monitoring system, even in a case where there are a plurality of control programs related to the abnormal parameter, it is possible to perform selection by focusing only on the related control program, so that the burden of monitoring on the worker can be further reduced.

It is preferable that the nuclear-power-plant operation monitoring system further includes a supervisory control device that the supervisor who supervises the worker operates, and a supervisory auxiliary display device that is disposed adjacent to the supervisory control device and performs the same display as the display on the non-safety control display unit. According to the plant operation monitoring system, it is possible to visually recognize the same screen as the operation screen of the non-safety control device of the worker even in a place where monitoring is performed. Therefore, according to the plant operation monitoring system, it is possible to reduce the burden of monitoring on the supervisor.

In order to solve the above-mentioned problems and achieve the object, a nuclear-power-plant operation monitoring system of the present invention is a nuclear-power-plant operation monitoring system disposed in a main control room of a nuclear power plant, and includes a display panel which is disposed at a position visible to all workers in the main control room, and displays a main parameter of the nuclear power plant; and a display panel control unit that controls display on the display panel. It is preferable that the display panel control unit detects a change trend showing a trend of a change of the main parameter for each time, and displays the change trend in association with the main parameter on the display panel.

According to the plant operation monitoring system, since the change trend is displayed, the worker himself or herself does not need to calculate the change trend, and the burden of monitoring on the worker can be reduced.

In the nuclear-power-plant operation monitoring system, it is preferable that the display panel control unit, in a case where a value of the main parameter increases by a first change amount or more as compared with a predetermined time before, displays increase information indicating that the value increases, and in a case where a value of the main parameter decreases by a second change amount or more as compared with a predetermined time before, displays decrease information indicating that the value decreases. According to the plant operation monitoring system, since it can be seen whether the value increases or decreases, it is possible to further reduce the burden of monitoring on the worker.

In the nuclear-power-plant operation monitoring system, it is preferable that the display panel control unit sets at least one of the predetermined time, the first change amount, and the second change amount, for each of the main parameters. According to the plant operation monitoring system, it is possible to visually recognize the change trend appropriately set for each type of main parameter, so it is possible to further reduce the burden of monitoring on the worker.

In the nuclear-power-plant operation monitoring system, it is preferable that the display panel control unit acquires information on an allowable upper limit, allowable lower limit, and an allowable median value which is a value between the allowable upper limit and the allowable lower limit, with respect to the main parameter, and in a case of displaying the increase information, if the main parameter is between the allowable lower limit and the allowable median value, first increase information is displayed, and if the main parameter is between the allowable median value and the allowable upper limit, second increase information which is different from the first increase information in display is displayed, and in a case of displaying the decrease information, if the main parameter is between the allowable median value and the allowable upper limit, first decrease information is displayed, and if the main parameter is between the allowable lower limit and the allowable median value, second decrease information which is different in display from the first decrease information is displayed. According to the plant operation monitoring system, parameters that are likely to be out of tolerance are displayed differently, which easily attracts workers' attention, so it is possible to further reduce the burden of monitoring on the worker.

Advantageous Effects of Invention

According to the present invention, the burden of monitoring on the worker can be reduced.

DESCRIPTION OF EMBODIMENTS

Hereinafter, preferred embodiments of the invention will be described in detail with reference to the drawings. It is to be noted that the present invention is not limited by the embodiment, and in a case where there are a plurality of embodiments, the present invention includes a combination of embodiments.

First Embodiment (Overall Configuration)

Figure 1:
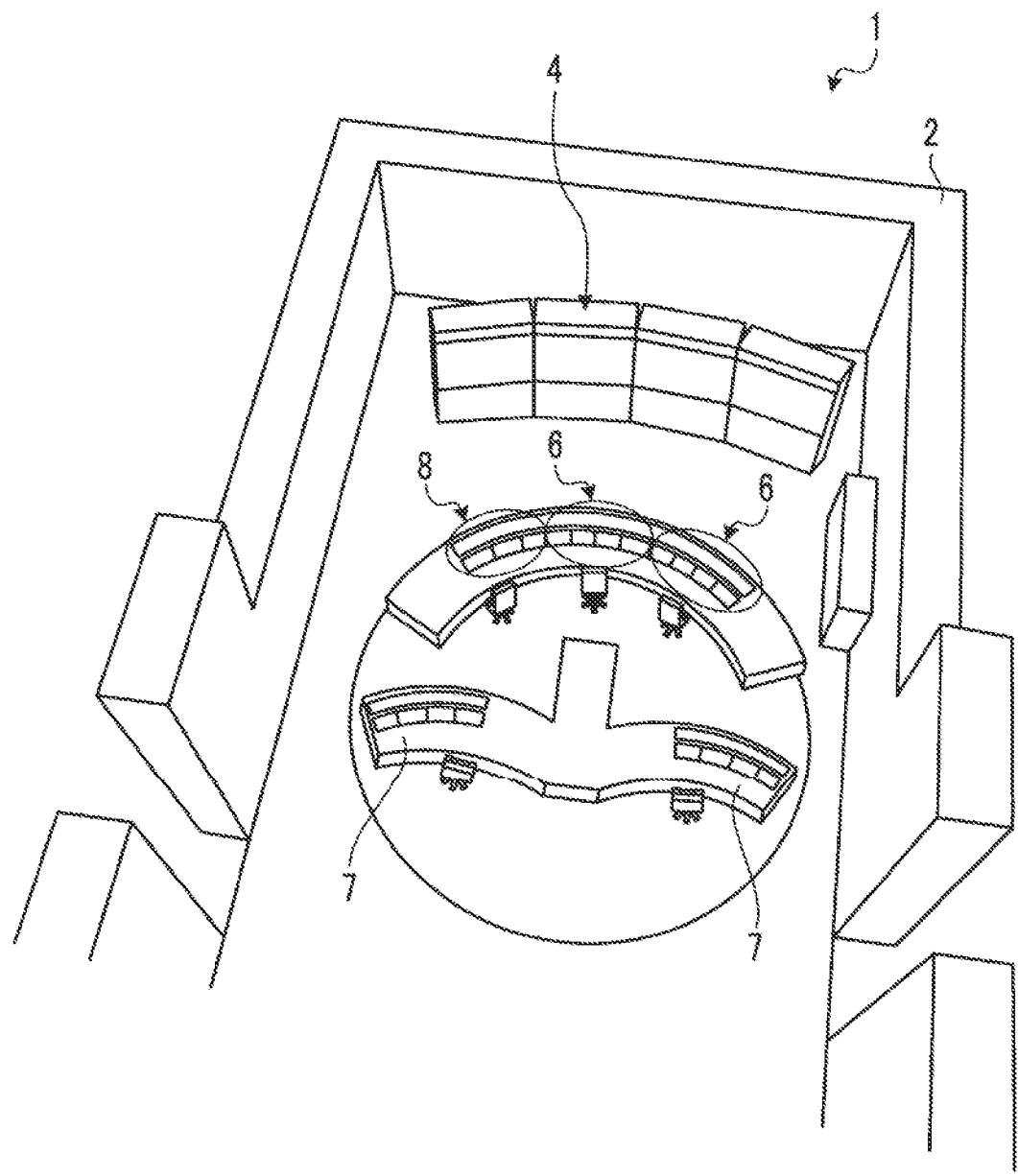
FIG. 1 is a schematic diagram showing a main control room in which a nuclear-power-plant operation monitoring system according to a present embodiment is disposed.
Figure 2:
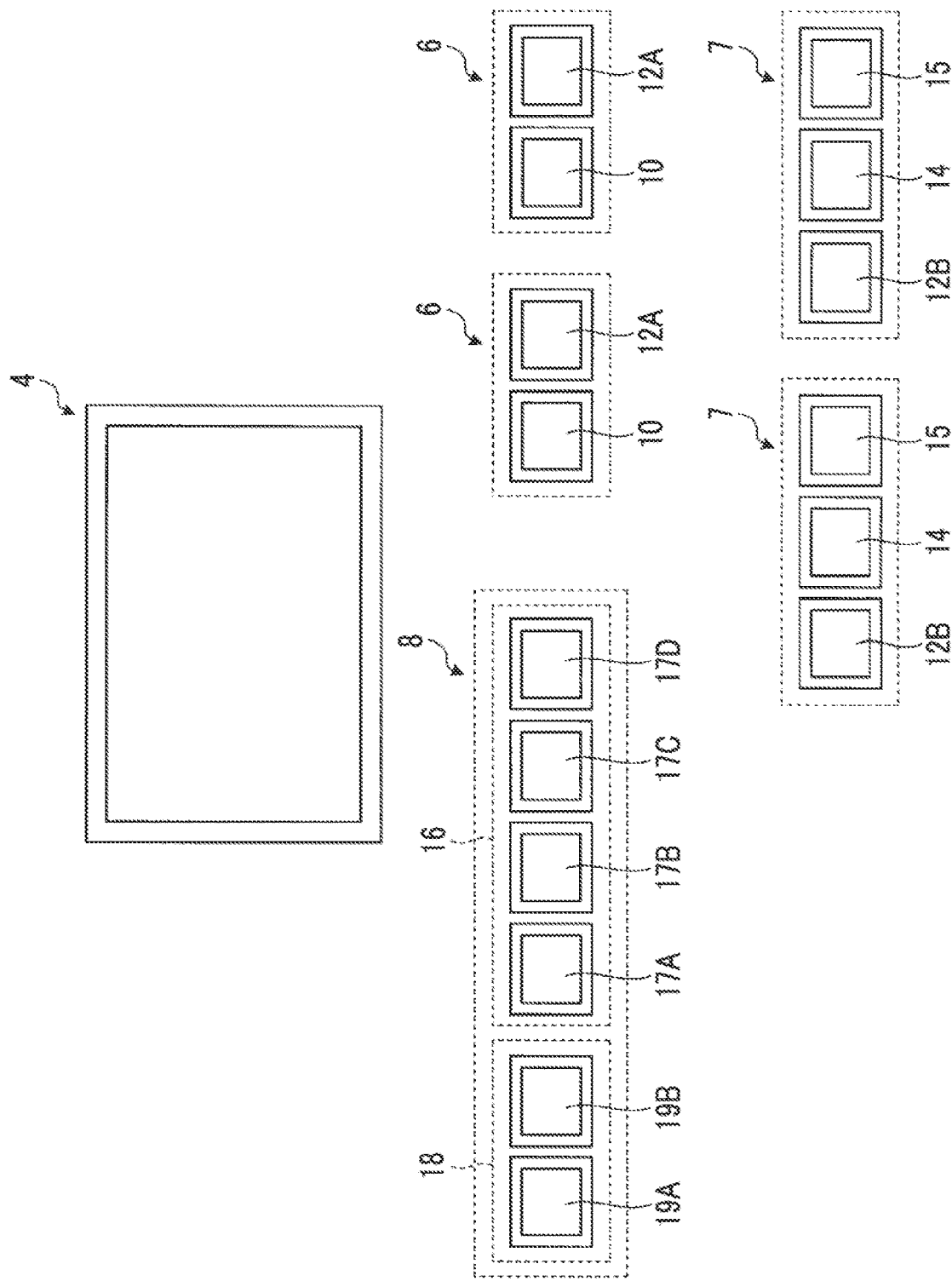
FIG. 2 is a block diagram showing a configuration of each unit of the nuclear-power-plant operation monitoring system according to the present embodiment.
Figure 3:
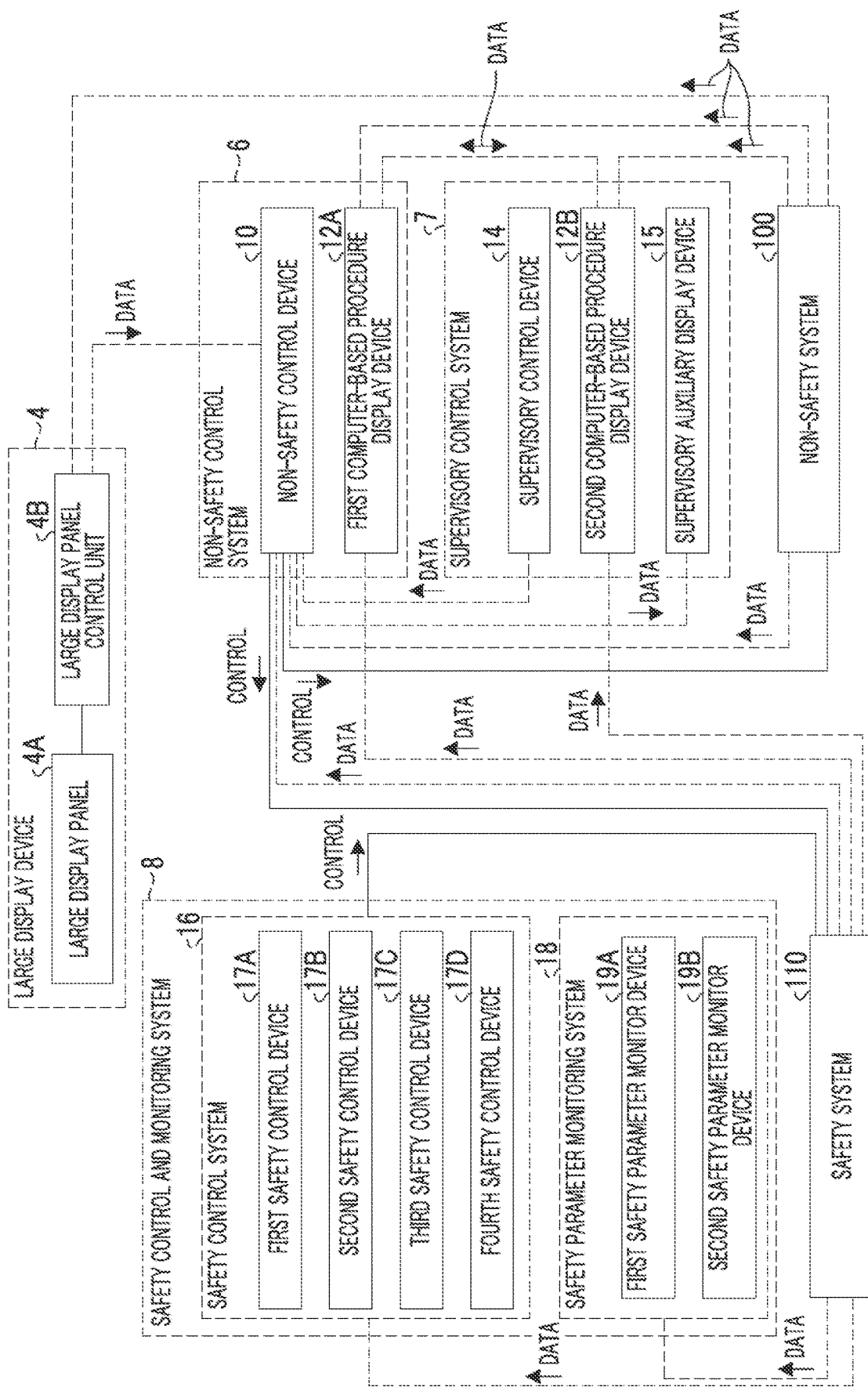
FIG. 3 is a block diagram showing a configuration of each unit of the nuclear-power-plant operation monitoring system according to the present embodiment.

First, the overall configuration of a nuclear-power-plant operation monitoring system 1 according to a first embodiment will be described. FIG. 1 is a schematic diagram showing a main control room in which a nuclear-power-plant operation monitoring system according to a present embodiment is disposed. FIGS. 2 and 3 are block diagrams showing the configuration of each unit of the nuclear-power-plant operation monitoring system according to the present embodiment.

The plant operation monitoring system 1 according to the present embodiment is a system that controls the operation of the nuclear power plant and operates the nuclear power plant, while monitoring the state of each unit of the nuclear power plant and parameters thereof. As shown in FIG. 1, the plant operation monitoring system 1 is located in the main control room 2 of the nuclear power plant. The main control room 2 is an almost hermetically sealed room. The main control room 2 is a room in which workers who monitor the operation of the nuclear power plant and supervisor who supervises the workers enter and operate the plant operation monitoring system 1.

The plant operation monitoring system 1 includes a large display device 4, a non-safety control system 6, a supervisory control system 7, and a safety control and monitoring system 8. The large display device 4, the non-safety control system 6, the supervisory control system 7, and the safety control and monitoring system 8 are located in the main control room 2. At the forefront of the main control room 2, the large display device 4 is located. The non-safety control system 6 and the safety control and monitoring system 8 are disposed toward the image display panel of this large display device 4, at a place facing the front surface of the large display device 4. The non-safety control system 6 and the safety control and monitoring system 8 are adjacent to each other. Then, the supervisory control system 7 is disposed toward the image display panel of the large display device 4, facing the front surface of the large display device 4 and behind the non-safety control system 6 and the safety control and monitoring system 8. In the present embodiment, two non-safety control system 6 are provided in such a manner that they can be used by two workers, respectively. Similarly, two supervisory control systems 7 are provided in such a manner that they can be used by two supervisors, respectively. Here, the number of non-safety control systems 6 and the number of supervisory control systems 7 are not limited thereto, and each may be one, or three or more.

The large display device 4 is disposed at a position visible to all workers and supervisors in the main control room 2, and displays the main parameter of each unit of the nuclear power plant in a large image display panel (for example, a set of four 100-inch panels). Even in a case where there are multiple workers and supervisors are present in the main control room 2, the image of the large display device 4 is visible to all workers and supervisors. The non-safety control system 6 performs monitoring and control of the non-safety (non-safety protection apparatus) system 100 of the nuclear power plant. The non-safety system 100 is various types of apparatuses installed in the nuclear power plant, and operates during the normal operation of the nuclear power plant. The supervisory control system 7 is a system that monitors the operation of the worker's operation on the non-safety control system 6 and issues a command to the worker. The safety control and monitoring system 8 performs the monitoring and control of the safety system 110 of the nuclear power plant. The safety system 110 is various types of apparatuses installed in the nuclear power plant, and safely stops the nuclear power plant at the time of abnormality of the nuclear power plant.

As shown in FIG. 2 and FIG. 3, the large display device 4 includes a large display panel 4A which is a large image display panel, and a large display panel control unit 4B. The non-safety control system 6 includes a non-safety control device 10, and a first computer-based procedure display device 12A. Further, the supervisory control system 7 includes a second computer-based procedure display device 12B, a supervisory control device 14, and a supervisory auxiliary display device 15. Further, the safety control and monitoring system 8 includes a safety control system 16, and safety parameter monitoring system 18.

FIG. 3 shows the connection relationship of each device. The large display panel control unit 4B acquires data such as the state of each unit of the non-safety system 100 and parameters thereof from the non-safety system 100, and displays predetermined main parameters among the acquired parameters and the like on the large display panel 4A. A detailed description of the large display panel 4A and the large display panel control unit 4B will be described later.

The non-safety control device 10 is operated by a worker, acquires various data of the non-safety system 100 from the non-safety system 100, displays it on the screen, and controls the operation of the non-safety system 100 by the operation by the worker. The non-safety control device 10 is also connected to the safety system 110. The non-safety control device 10 acquires various data of the safety system 110, displays it on the screen, and controls the operation of the safety system 110 by using a separation device (not shown) by the operating by a worker. The first computer-based procedure display device 12A is operated by a worker, and displays a computer-based procedure when the nuclear power plant is controlled. A detailed description of the non-safety control device 10 and the first computer-based procedure display device 12A will also be described later.

The second computer-based procedure display device 12B is operated by the supervisor and is a device for displaying the computer-based procedure when the nuclear power plant is controlled. A detailed description of the second computer-based procedure display device 12B will be described later. The supervisory control device 14 is operated by the supervisor, and outputs information input by the supervisor to the non-safety control device 10, thereby giving a command to control the worker non-safety system 100. The supervisory auxiliary display device 15 is a monitor monitored by the supervisor, and displays the same screen as the screen displayed on the non-safety control device 10.

As shown in FIG. 3, the safety control and monitoring system 8 is not connected to the non-safety control system 6, the supervisory control system 7, and the non-safety system 100. On the other hand, the non-safety control system 6 and the supervisory control system 7 are not connected to the safety control and monitoring system 8, but are connected to the safety system 110. The safety system 110 can be controlled and monitored by the non-safety control system 6 and the safety control and monitoring system 8. The worker controls and monitors the safety system 110 by the safety control and monitoring system 8, in a case where a failure occurs in, for example, the non-safety control system 6 and operation becomes impossible.

As shown in FIG. 2 and FIG. 3, the safety control system 16 includes four devices (computers) of a first safety control device 17A, a second safety control device 17B, a third safety control device 17C, and a fourth safety control device 17D. As will be described in detail later, the first safety control device 17A, the second safety control device 17B, the third safety control device 17C, and the fourth safety control device 17D are provided for each train, and performs control and monitoring individually the safety system 110.

As shown in FIG. 2 and FIG. 3, the safety parameter monitoring system 18 includes two devices (computers) of a first safety parameter monitor device 19A and a second safety parameter monitor device 19B. As will be described in detail later, the first safety parameter monitor device 19A and the second safety parameter monitor device 19B sequentially acquires data such as the state of each unit of the safety system 110 and parameters thereof from the safety system 110 and displays it.

(Computer-Based Procedure Display Device)

The first computer-based procedure display device 12A is operated by the worker and the second computer-based procedure display device 12B is operated by the supervisor, but each device has the same function. Hereinafter, in a case of not distinguishing between the first computer-based procedure display device 12A and the second computer-based procedure display device 12B, they are described as a computer-based procedure display device 12. Hereinafter, the computer-based procedure display device 12 will be described in detail.

Figure 4:
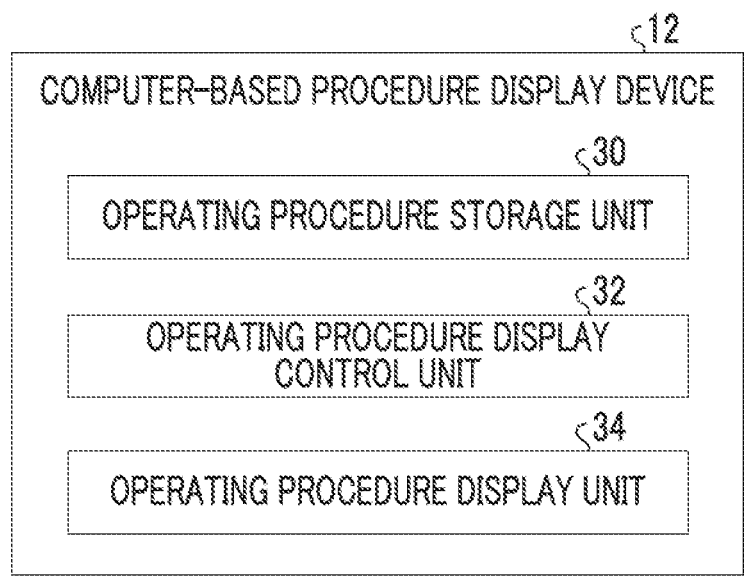
FIG. 4 is a block diagram showing a configuration of a computer-based procedure display device.

FIG. 4 is a block diagram showing a configuration of a computer-based procedure display device. As shown in FIG. 4, the computer-based procedure display device 12 includes a operating procedure storage unit 30, a operating procedure display control unit 32, and a operating procedure display unit 34. The computer-based procedure display device 12 reads the computer-based procedure collection M0 stored in the operating procedure storage unit 30 by the operating procedure display control unit 32 and displays it on the operating procedure display unit 34.

The computer-based procedure collection M0 is electronic data in which an operation procedure for operating a nuclear power plant is described. The computer-based procedure collection M0 has different plurality of computer-based procedure M for each operation content (the operation of a nuclear reactor, the shutdown of a nuclear reactor, or the like). In each computer-based procedure M, the procedures for performing the operation are divided into procedure steps and described. The computer-based procedure M is data of the operation procedure at the normal time of the nuclear power plant, or the operation procedure at the time of abnormality. That is, the computer-based procedure collection M0 describes control contents of both the non-safety system 100 and the safety system 110. However, the computer-based procedure collection M0 may have only the computer-based procedure M at the normal time.

The operating procedure storage unit 30 stores the computer-based procedure collection M0 described above. The operating procedure display control unit 32 controls display of the computer-based procedure M by the operating procedure display unit 34. The operating procedure display unit 34 is an image display panel, and displays the computer-based procedure M. In the present embodiment, the operating procedure display unit 34 is a touch panel for detecting the input by the worker or the supervisor.

When the computer-based procedure display device 12 is activated by the operator (the worker or the supervisor), the operating procedure display control unit displays a login screen on the operating procedure 32 display unit 34. The operator can operate the computer-based procedure display device 12 by entering its own ID and password on the login screen. The operating procedure display control unit 32 causes the operator to perform login in this way so as to be able to specify the operator.

Figure 5:
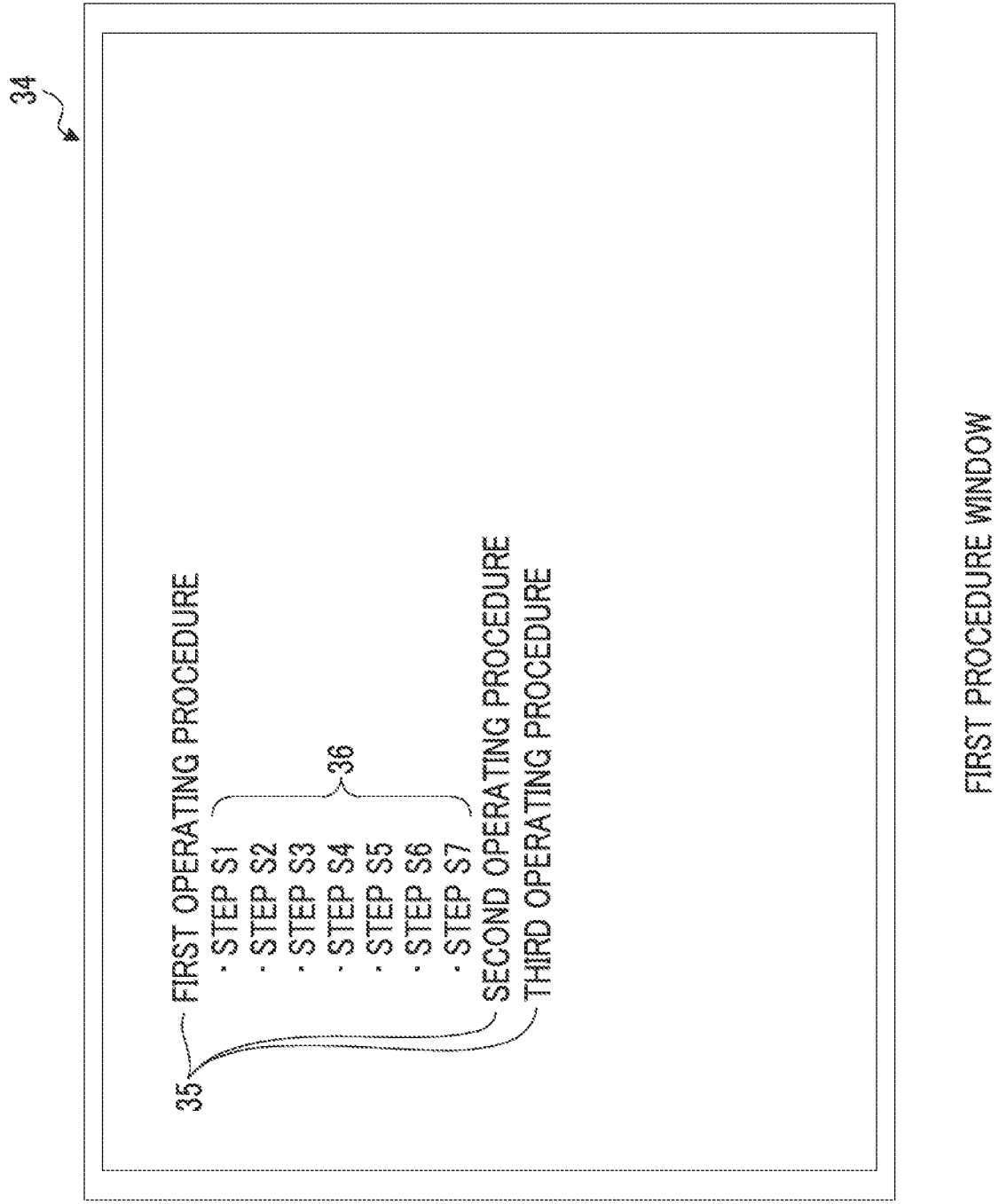
FIG. 5 is a diagram showing an example of a screen of a first procedure window of a operating procedure display unit.

FIG. 5 is a diagram showing an example of the screen of a first procedure window on the operating procedure display unit. The operating procedure display control unit 32 displays a first procedure window on the operating procedure display unit 34 after confirming the login. As shown in FIG. 5, the first procedure window is a folder display screen, and displays a operating procedure image 35 as a main folder and a step image 36 as a sub-folder. The operating procedure image 35 displays the serial number of each computer-based procedure M in the computer-based procedure collection M0 stored in the operating procedure storage unit 30. That is, the operating procedure image 35 is a display for distinguishing each computer-based procedure M from each other, and may display the name of each computer-based procedure M. The step image 36 is a lower layer folder of the operating procedure image 35, and displays the serial number of the procedure step of the computer-based procedure M displayed in the operating procedure image 35. In the example of FIG. 5, the operating procedure image 35 displays a first operating procedure, a second operating procedure, a third operating procedure as the serial numbers of the computer-based procedure M. In the example of the present embodiment, the operation procedure described in the first operating procedure includes a total of seven procedure steps of step S1, step S2, step S3, step S4, step S5, step S6, and step S7. When performing the operation described in the first operating procedure, the worker executes each of procedure steps from step S1 to step S7 in this order, and thus the plant operation in the first operating procedure is completed. In the example of FIG. 5, step S1, step S2, step S3, step S4, step S5, step S6, and step S7 are illustrated as the step image 36 which is the lower layer folder of the operating procedure image 35 of the first operating procedure.

When detecting the operator's selection of the operating procedure image 35 in which the corresponding step image 36 is not displayed, that is, the touch on the operating procedure image 35, the operating procedure display control unit 32 displays the step image 36 corresponding to the operating procedure image 35. When detecting the operator's touch on the operating procedure image 35 on which the corresponding step image 36 is displayed, the operating procedure display control unit 32 hides the step image 36 corresponding to the operating procedure image 35. In the example of FIG. 5, the lower layer step image 36 of the first operating procedure is in the display state, and the step images 36 of the second operating procedure and third operating procedure are in the non-display state.

Figure 6:
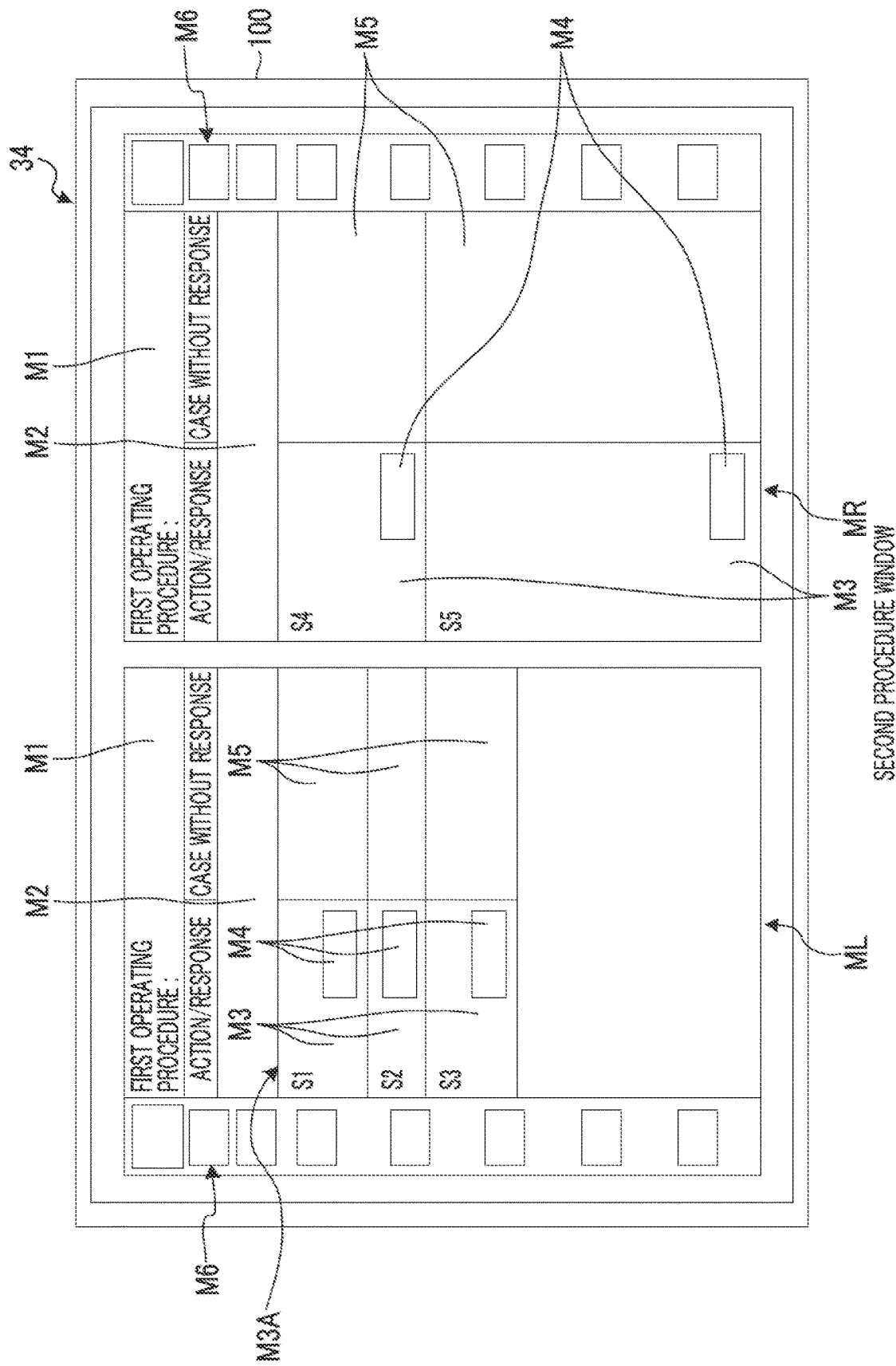
FIG. 6 is a diagram showing an example of a screen of a second procedure window on the operating procedure display unit.

FIG. 6 is a diagram showing an example of the screen of a second procedure window on the operating procedure display unit. When detecting the selection of the step image 36 by the operator, that is, the touch on the step image 36, the operating procedure display control unit 32 changes the display from the first procedure window to the second procedure window. The second procedure window is to display a page of the computer-based procedure M in which the procedure step of step image 36 selected by the operator is described. However, the display change from the first procedure window to the second procedure window is not limited to this. As long as the operating procedure display control unit 32 causes the operator to select a desired computer-based procedure M from the computer-based procedure collection M0, and displays the selected computer-based procedure M on the operating procedure display unit 34 in the second procedure window, the procedure for displaying the second procedure window is arbitrary.

As shown in FIG. 6, in the second procedure window, the operating procedure display unit 34 displays the computer-based procedure M on two pages, that is, a left page ML and a right page MR. The contents described on the left page ML and the right page MR are the same as those on the corresponding page of the paper medium operating procedure which is the basis of the computer-based procedure M. Further, the left page ML and the right page MR are consecutive pages. For example, in a case where the third page is displayed on the left page ML, the next fourth page is displayed on the right page MR. The operating procedure display unit 34 displays the whole of the left page ML and the right page MR on one screen. Therefore, the worker can view all the procedures described on the page without scrolling the screen.

As shown in FIG. 6, the left page ML and the right page MR each have a title image M1, a comment image M2, an action image M3, a parameter image M4, a backup action image M5, an operation button image M6. The title image M1 is an image displayed at the top of each page, and information on the computer-based procedure M, for example, the serial number of the computer-based procedure M and details of operation (reactor operation, reactor shutdown, or the like) are displayed.

The comment image M2 is an image displayed below the title image M1, and a description of the procedure step displayed on the page is displayed. The explanation in the comment image M2 is a precaution for executing the procedure step, such as for example, an explanation as to whether the procedure step should be executed immediately.

The action image M3 is an image displayed below the comment image M2, and the number of the procedure step, the content of the action, and the content of the normal response are displayed. The number of the procedure step is, for example, step S1, step S2, step S3, or the like, as shown in FIG. 6. The content of the action is the content of the procedure executed by the worker in the procedure step. The content of the normal response is the displayed content of a normal reaction occurring in the nuclear power plant (for example, a pressure level is lowered normally, in a procedure of lowering the pressure level in which the signal of the corresponding place becomes blue), in a case where the procedure is executed correctly. The action image M3 is displayed for each procedure step.

The parameter image M4 is an image displaying the value and state of the related parameter which is the parameter of the nuclear power plant related to the procedure step in the action image M3. The related parameter is various data to be controlled in the procedure step, a parameter which changes by executing the procedure step, and the like. The operating procedure storage unit 30 stores the type of the related parameter for each procedure step. The operating procedure display control unit 32 reads out the type of the related parameter of the displayed procedure step from the operating procedure storage unit 30, and acquires the current value and the current state of the read related parameter from the non-safety system 100 or the safety system 110, and displays them in the parameter image M4. The operating procedure display control unit 32 acquires the current value of the related parameter for each time, and displays the value and state of the latest related parameter. Further, the operating procedure display control unit 32 may display the change for each time in the value of the related parameter in the parameter image M4.

The parameter image M4 is displayed for each related procedure step. The parameter image M4 is displayed in the display area of the related action image M3. However, as long as the parameter image M4 is displayed in association with the related action image M3, that is, it is a display that allows the operator to visually recognize which action image M3 the parameter corresponds to, the display position is arbitrary.

The backup action image M5 is an image in which the contents of the backup action for each procedure step is displayed. The backup action is the content of control to be performed by the worker in the case where a normal response does not occur even if the procedure step is executed. The backup action image M5 displays, for example, an instruction for confirming the corresponding portion, information on the procedure step to be executed next, and the like as a backup action. For example, in a case where a normal response occurs in step S1, the worker moves to step S2 which is the next step, but in a case where a normal response does not occur, the worker does not move to step S2, moves to another procedure step which is designated as the backup action, and executes the procedure.

The backup action image M5 is displayed for each procedure step. The backup action image M5 is displayed next to the action image M3 of the same procedure step (on the right side in the example of FIG. 6). However, as long as the backup action image M5 is displayed in association with the action image M3 of the same procedure step, that is, it is a display that allows the operator to visually recognize which action image M3 the backup action or the like corresponds to, the display position is arbitrary.

The operation button image M6 is an image in which various operation buttons are displayed. As operation buttons, there are a bookmark button for moving to the bookmarked page, a history display button for moving to the already displayed page, a folder button for returning to a first procedure window, a foldout button for displaying a foldout page to be described later, a move button for moving a page, a printout button for printing out, a sticky note button for adding a highlight mark to a page, a logout button for logging out, and the like. When detecting the selection of each operation button, that is, the touch of each operation button, the operating procedure display control unit 32 executes the function assigned to the operation button.

The second procedure window has the above-described layout, but the display of the left page ML and the right page MR can be set to a display mode other than the display mode (continuous display mode) displaying the continuous pages of the same computer-based procedure M described in FIG. 6 For example, in a case where the operator activates two computer-based procedures M, the operating procedure display control unit 32 may display separate computer-based procedures M in the left page ML and the right page MR (independent display mode).

Figure 7:
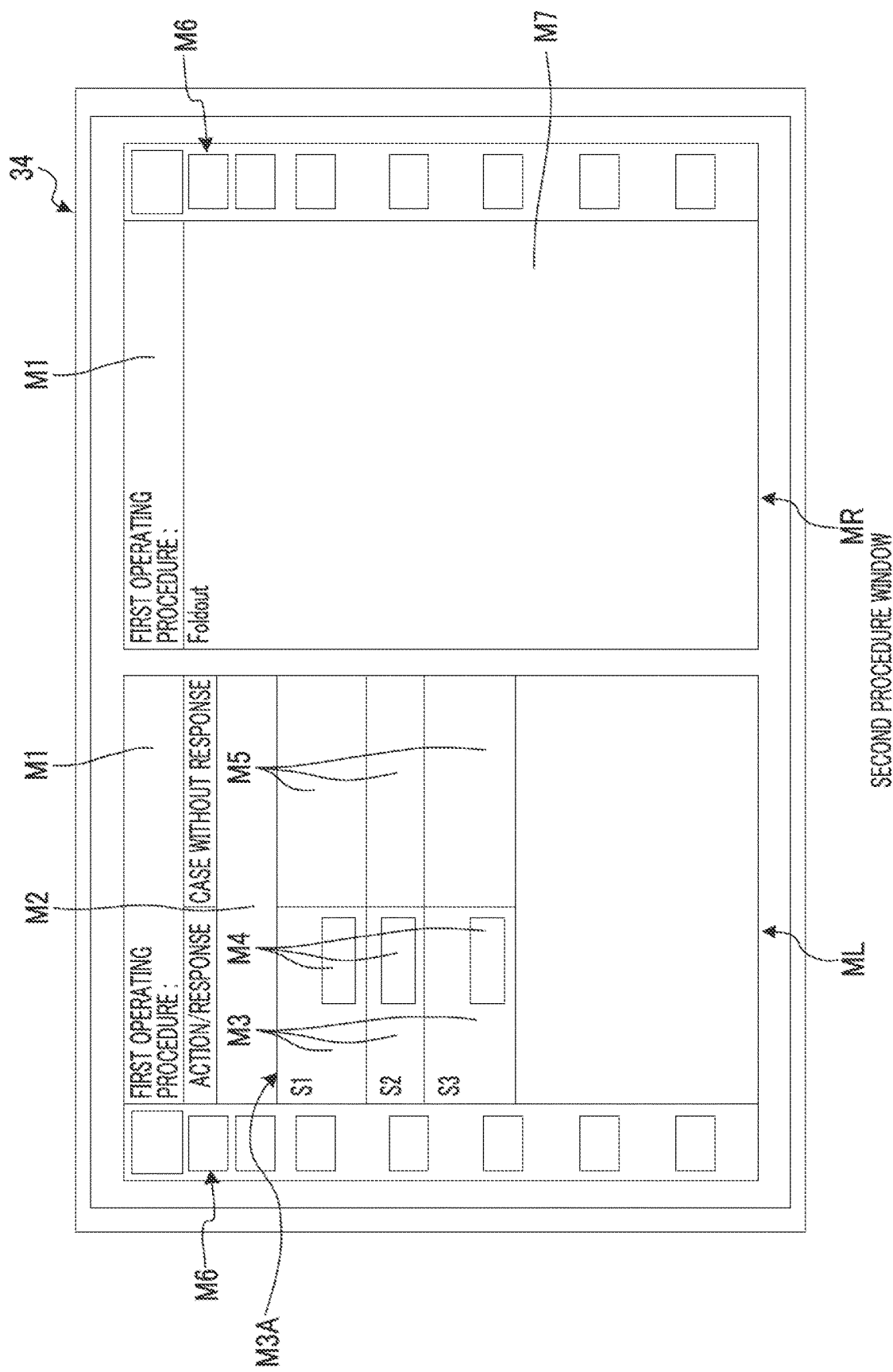
FIG. 7 is a diagram showing an example of display of a foldout page of the operating procedure display unit.

In addition, in a case where a foldout page is assigned to the procedure step displayed on the left page ML, the operating procedure display control unit 32 may display the foldout page in the right page MR (foldout display mode). FIG. 7 is a diagram showing an example of display of a foldout page of the operating procedure display unit. As shown in FIG. 7, a foldout page (folded page) is a page displayed on the right page MR and has a foldout image M7. The foldout image M7 displays the type of parameter that should be monitored (checked) immediately in a case where the procedure step displayed on the left page ML is executed. A foldout page is provided for each procedure step, and some procedure steps do not have a foldout page.

In a case where a foldout page is assigned to the procedure step displayed on the left page ML, the operating procedure display control unit 32 may display the foldout page in the right page MR even if there is no operator's operation. However, the operating procedure display control unit 32 may be in a continuous display mode in a case where there is no operator's operation. In this case, the operating procedure display control unit 32 displays an indication in which a foldout page is attached, in association with the procedure step to which the foldout page is attached, and in a case where the touch of the above-mentioned foldout button by the operator is detected, the foldout page may be displayed on the right page MR.

As described above, the operating procedure display unit 34 displays the computer-based procedure M in the second procedure window. In addition, the operating procedure display control unit 32 displays a message indicating that each procedure step is selected by the operator, on the second procedure window. In a case of detecting the selection of the procedure step by the operator in the second procedure window (in a case where the touch on the action image M3 by the operator is detected), the operating procedure display unit 34 displays an indication that the procedure step has been selected, on the operating procedure display unit 34. Specifically, in a case of detecting a touch of the operator on the procedure step display area M3A which is the area where the action image M3 is displayed, the operating procedure display control unit 32 changes the color of the procedure step display area M3A. In the present embodiment, the operating procedure display control unit 32 displays one of the first, second, third and fourth colors in the procedure step display area M3A. The operating procedure display control unit 32 switches color to be displayed, each time a touch is detected. First color indicates an unexecuted state in which the procedure step is not executed. Second color indicates an execution state in which the procedure step is being executed. Third color indicates an end state in which the procedure step is ended. Fourth color indicates a non-applied state in which the procedure step is not applied (not executed) in the current control. First, the operating procedure display control unit 32 displays the first color in the procedure step display areas M3A of all procedure steps. The operating procedure display control unit 32 changes the color while looping through the second color, the third color, the fourth color, the first color, . . . , for each touch detection.

By changing the color of the procedure step display area M3A as described above, for example, the operator can check that the procedure step having the third color as display color has been executed, and the operator can check that the procedure step having the second color as display color is being executed.

However, as long as the operating procedure display control unit 32 can display a notification indicating each state (an unexecuted state, an execution state, an end state, or a non-applied state) of the procedure step on the procedure step display area M3A, the notification is not limited to changing the color. For example, the operating procedure display control unit 32 may display letters indicating each state name or different marks assigned to respective states in the procedure step display area M3A. Further, the operating procedure display control unit 32 is not limited to notifying the above-mentioned four states, and may display at least an end state. In other words, in a case where the selection of the procedure step is detected, the operating procedure display control unit 32 may display an indication that the procedure described in the procedure step has been executed, on the operating procedure display unit 34. For example, the operating procedure display control unit 32 may display two types of states of the initial state (for example, the unexecuted state) where touch is not yet made and the state (for example, the end state) in a case where touch is made, on the operating procedure display unit 34.

The operating procedure display control unit 32 can specify the operator who makes the touch, based on the ID of the operator who makes the touch. The operating procedure display control unit 32 stores the contents of the procedure step selected by the touch, the ID of the operator who makes the touch, and the state of the procedure step which is changed due to the touch (the unexecuted state, the execution state, the end state, or non-applied state) in the operating procedure storage unit 30 in association with each other. This makes it possible to check which worker or supervisor changes the state of which procedure step and how.

The relationship between the first computer-based procedure display device 12A and the second computer-based procedure display device 12B will be described below. The first computer-based procedure display device 12A and the second computer-based procedure display device 12B display the same computer-based procedure M. That is, the worker controls the nuclear power plant while viewing the display of the computer-based procedure M of the first computer-based procedure display device 12A. The supervisor supervises the operation by the worker while viewing the display of the same computer-based procedure M as that of the first computer-based procedure display device 12A. Although the first computer-based procedure display device 12A and the second computer-based procedure display device 12B display the same computer-based procedure M, the page to be displayed may differ depending on the operation on each computer-based procedure display device 12.

In a case where the touch of one of the procedure step display areas M3A is detected, the first computer-based procedure display device 12A and the second computer-based procedure display device 12B each change not only the color of the procedure step display area M3A of its own, but also the procedure step display area M3A of the same procedure step in another computer-based procedure display device 12 to the same color. For example, in a case where the worker touches to change the procedure step display area M3A of step S1 of the first computer-based procedure display device 12A to second color, the operating procedure display control unit 32 of first computer-based procedure display device 12A outputs information on that effect to the operating procedure display control unit 32 of the second computer-based procedure display device 12B. The operating procedure display control unit 32 of the second computer-based procedure display device 12B changes the area of the procedure step display area M3A of step S1 of its own operating procedure display unit 34 to second color, based on the information.

In addition, even in a case where there is a plurality of first computer-based procedure display device 12A and second computer-based procedure display device 12B, if touch of the procedure step display area M3A of any one computer-based procedure display device 12 is detected, the colors of the areas of the procedure step display areas M3A of all computer-based procedure display devices 12 are changed to the same color. Since the change in the color of the procedure step display area M3A is reflected in all the computer-based procedure display devices 12, even in a case where touches are made by a plurality of operators a plurality of times, a change in color by the last touch can reflect on all the computer-based procedure display devices 12.

Further, when the color of the procedure step display area M3A is changed, the operating procedure display control unit 32 displays the ID of the operator who makes the touch in the procedure step display area M3A, for example, by pop-up, or the like. The operating procedure display control unit 32 similarly displays the ID of the operator in the procedure step display area M3A of another computer-based procedure display device 12. As a result, the operators (workers and supervisors) of all the computer-based procedure display devices 12 can check on the spot, which worker or supervisor changes the state of which procedure step and how.

In the present embodiment, the first computer-based procedure display device 12A and the second computer-based procedure display device 12B are described as separate devices (computers) which are independent, but these devices may be configured as a single device which has a plurality of (two) operating procedure display units 34. That is, in the present embodiment, a plurality of computer-based procedure display devices 12 each including one operating procedure storage unit 30, one operating procedure display control unit 32, and one operating procedure display unit 34 may be used. However, the computer-based procedure display device 12 may include one operating procedure storage unit 30, one operating procedure display control unit 32, and a plurality of operating procedure display units 34. In such a case, the operating procedure display control unit 32 controls display of the plurality of operating procedure display units 34, but the content of the display control is the same as described above.

Figure 8:
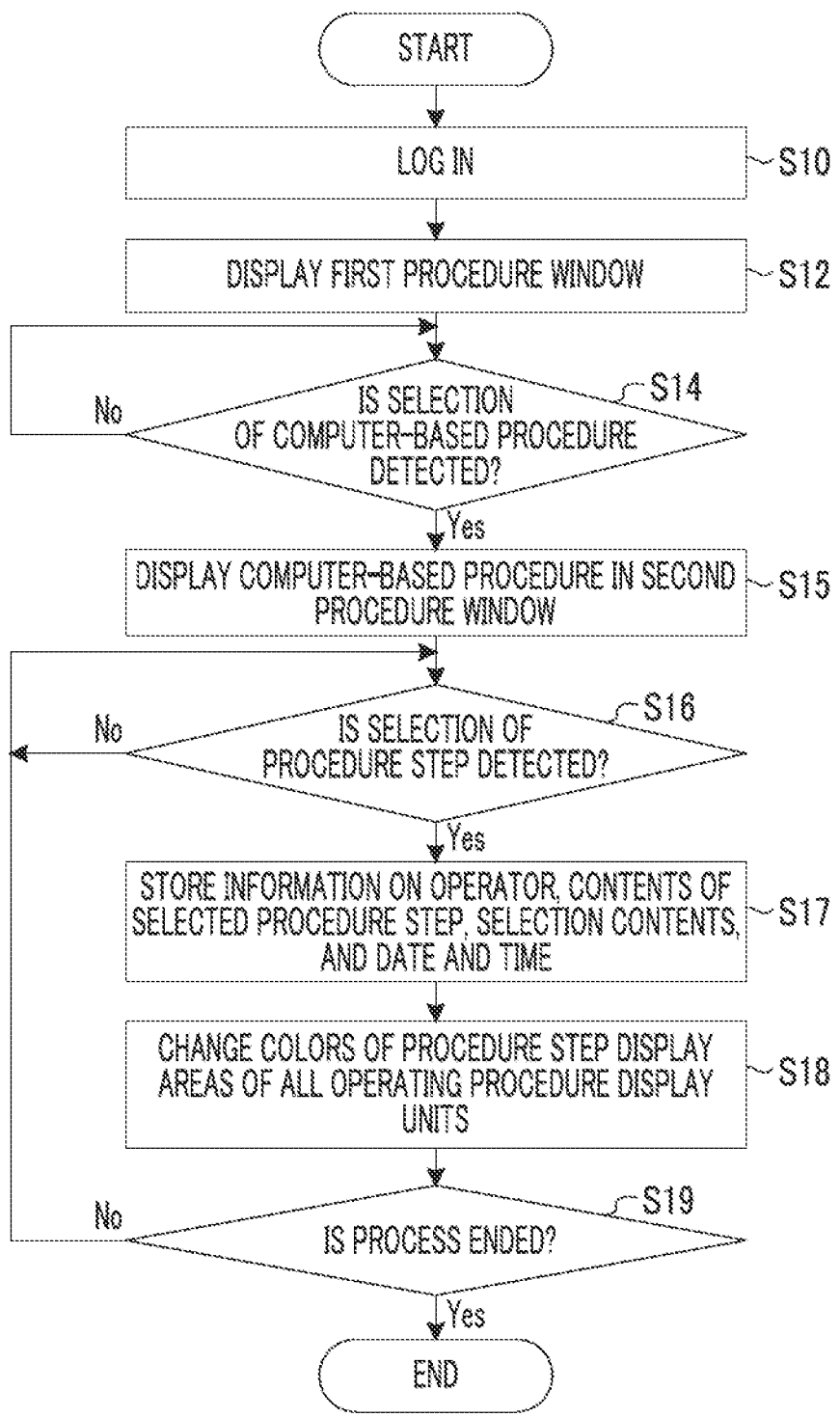
FIG. 8 is a flowchart for explaining a control flow of display on the operating procedure display unit by a operating procedure display control unit.

Hereinafter, a control flow of display on the operating procedure display unit 34 by the operating procedure display control unit 32 will be described based on a flowchart. FIG. 8 is a flowchart for explaining a control flow of display on the operating procedure display unit by a operating procedure display control unit. As shown in FIG. 8, in a case where the computer-based procedure display device 12 is activated by the operator, the operating procedure display control unit 32 displays a login screen on the operating procedure display unit 34 and causes the operator to log in (step S10). After detecting the login from the operator, the operating procedure display control unit 32 displays the first procedure window on the operating procedure display unit 34 (step S12) and determines whether the selection of the computer-based procedure M by the operator is detected or not (step S14). The first procedure window is a screen for allowing the operator to select a desired computer-based procedure M from the computer-based procedure collection M0. If the selection of the computer-based procedure M by the operator is detected (step S14; Yes), the operating procedure display control unit 32 displays the second procedure window on the operating procedure display unit 34 and displays the selected computer-based procedure M (step S15). If the selection of the computer-based procedure M by the operator is not detected (step S14; No), the operating procedure display control unit 32 returns to step S14 and continues to detect the selection of the computer-based procedure M by the operator.

After displaying the computer-based procedure M in the second procedure window, the operating procedure display control unit 32 determines whether or not the selection by the operator is detected for the procedure step in the displayed computer-based procedure M (step S16). In a case where a touch operation is performed on the procedure step display area M3A which is the area in which the contents of procedure step is described, the operating procedure display control unit 32 determines that the procedure step is selected by the operator. In a case where the selection by the operator is detected (step S16; Yes), the information on the operator who makes the selection, the contents of the selected procedure step, the selection contents, and the date and time of selection are stored in the operating procedure storage unit 30 (step S17). The information on the operator who makes the selection is the ID of the operator. The selection contents is information on which color the color of the procedure step display area M3A is to be changed, that is, which state (the unexecuted state, the execution state, the end state, or the non-applied state) the procedure step is to be made. If the selection by the operator is not detected (step S16; No), the procedure returns to step S16, and the selection of the procedure step by the operator is continued to detect.

The operating procedure display control unit 32 stores the information on the operator, the contents of the selected procedure step, the selection content, and the date and time, and then changes the colors of the procedure step display areas M3A of all the operating procedure display units 34 (step S18). That is, in a case where there are a plurality of computer-based procedure display devices 12, when the selection of the procedure step display area M3A of any one of the computer-based procedure display devices 12 is detected, the operating procedure display control unit 32 changes the area of the same procedure step display area M3A of each of the computer-based procedure display devices 12 to the same color.

After changing the color of the procedure step display areas M3A of all the operating procedure display units 34, the process moves to step S19. In a case where the display process of the computer-based procedure M by the operator is ended (step S19; Yes), the display process is ended. If the display process of the computer-based procedure M by the operator is not ended (step S19; No), the process returns to step S16 and continues the display process.

As described above, the nuclear-power-plant computer-based procedure display device 12 according to the present embodiment includes the operating procedure storage unit 30, the operating procedure display control unit 32, and the operating procedure display unit 34. The operating procedure storage unit 30 store the computer-based procedure M. The computer-based procedure M is data in which plant operation procedures of the nuclear power plant are divided into procedure steps and listed. The operating procedure display unit 34 displays the computer-based procedure M. The operating procedure display control unit 32 controls display of the computer-based procedure M, and displays an indication that the procedure step is selected, on the operating procedure display unit 34, in a case where the procedure step displayed on the operating procedure display unit 34 is selected by the operator of the computer-based procedure display device 12.

According to the computer-based procedure display device 12, the worker can operate the nuclear power plant according to the display of the computer-based procedure M. At this time, in a case where the worker selects the procedure step on the operating procedure display unit 34, the computer-based procedure display device 12 displays an indication that the procedure step is selected. For example, when the execution of a certain procedure step is ended, the worker selects the procedure step on the operating procedure display unit 34. Since the indication that the procedure step is selected is displayed on the operating procedure display unit 34, the worker visually recognizes the display of the procedure step so as to be able to check the progress status of the procedure step (for example, the end of the procedure step, or the like) according to the selection. As described above, according to the computer-based procedure display device 12, the worker can check the progress status of the procedure step, from the display on the operating procedure display unit 34, while performing the plant operation of the nuclear power plant according to the display of the computer-based procedure M. Therefore, according to the computer-based procedure display device 12, the worker can suppress the erroneous operation in the plant operation of the nuclear power plant, it is possible to reduce the burden of monitoring and work burden.

In addition, in a case where the selection of procedure step is detected, the operating procedure display control unit 32 displays an indication that the procedure described in the procedure step has been executed (the end state), as the indication that the procedure step is selected, on the operating procedure display unit 34. According to the computer-based procedure display device 12, an indication that the procedure described in the procedure step has been executed is displayed. Therefore, the worker visually recognizes the display and can suppress the erroneous operation in the plant operation of the nuclear power plant, it is possible to reduce the burden of monitoring and work burden.

The operating procedure display control unit 32 also displays the parameter of the nuclear power plant related to the procedure step in association with the display of the procedure step (an action image M3). According to the computer-based procedure display device 12, the procedure step can be executed while the parameter related to the procedure step and the contents of the procedure step are checked on the same screen. Therefore, the worker visually recognizes the display and can suppress the erroneous operation in the plant operation of the nuclear power plant, it is possible to reduce the burden of monitoring and work burden.

Further, the operating procedure display control unit 32 specifies the operator who selects the procedure step, and stores information on the operator who selects the procedure step in association with the selected procedure step, in the operating procedure storage unit 30. According to the computer-based procedure display device 12, by reading the information of the operating procedure storage unit 30, it becomes possible to check which worker or supervisor changes the state of which procedure step and how. Therefore, according to the computer-based procedure display device 12, it is possible to check the work history, thereby reducing the burden of monitoring in the plant operation of the nuclear power plant.

The operating procedure display unit 34 is a touch panel having the procedure step display area M3A in which the procedure step is displayed. In a case where the procedure step display area M3A is touched by the operator, the operating procedure display control unit 32 displays an indication that the procedure step displayed in the procedure step display area M3A is selected, by changing the color of the procedure step display area M3A which is touched. According to the computer-based procedure display device 12, the procedure step can be selected by touching the procedure step display area M3A in which the procedure step is described. Therefore, erroneous selection by the operator can be suppressed. According to the computer-based procedure display device 12, it is possible to display that the selection has been made, by changing the color of the procedure step display area M3A in which the procedure step is described. Therefore, the computer-based procedure display device 12 can suppress erroneous visual recognition as to whether the operator is selected or not. In this manner, according to the computer-based procedure display device 12, it is possible to reduce the burden of monitoring in the plant operation of the nuclear power plant.

The computer-based procedure display device 12 according to the present embodiment also includes a plurality of operating procedure display units 34 that displays the computer-based procedure M having the same contents. In a case where the procedure step displayed on any one of the operating procedure display units 34 is selected, the operating procedure display control unit 32 displays an indication that the procedure step is selected, on another operating procedure display unit 34. According to the computer-based procedure display device 12, even in a case where the computer-based procedure M displayed on each operating procedure display unit 34 is read by a plurality of workers or observers, all the workers or the observers can confirm on the spot that the procedure step is selected, that is, the progress status of the procedure step. Therefore, according to the computer-based procedure display device 12, it is possible to reduce the burden of monitoring in the plant operation of the nuclear power plant.

Note that the states of the procedure step set in the present embodiment are four types of the unexecuted state, the execution state, the end state, and the non-applied state, and all workers and supervisors can perform a change to the state by touch (change the color). However, the operating procedure display control unit 32 may limit a person who can perform a change to each state, based on the information (ID) of the operator, that is, may accept a selection only by the predetermined person with respect to a change to a predetermined state. For example, the operator of the operation procedure is not a supervisor but a worker. Therefore, the operating procedure display control unit 32 accepts a change to the execution state (a change to the second color) or a change to the end state (a change to the third color) only in a case where the worker performs a selection (touch), and does not perform the change to the execution state (the change to the second color) or the change to the end state (the change to the third color) even if the supervisor performs a selection (touch).

In this case, as the state of the procedure step, an approval state (for example, fifth color) that only the supervisor can select may be added. For example, worker selects (touches) the procedure step from the second procedure window on the operating procedure display unit 34 and changes it to the end state, in a case where a certain procedure step ends. After confirming that the procedure step has ended, the supervisor changes the procedure step to the approval state, by selecting (touching) the procedure step changed to the end state. This allows all workers and supervisors to recognize that the end of the procedure step is confirmed (approved) from the supervisor.

(Safety Control and Monitoring System)

Figure 9:
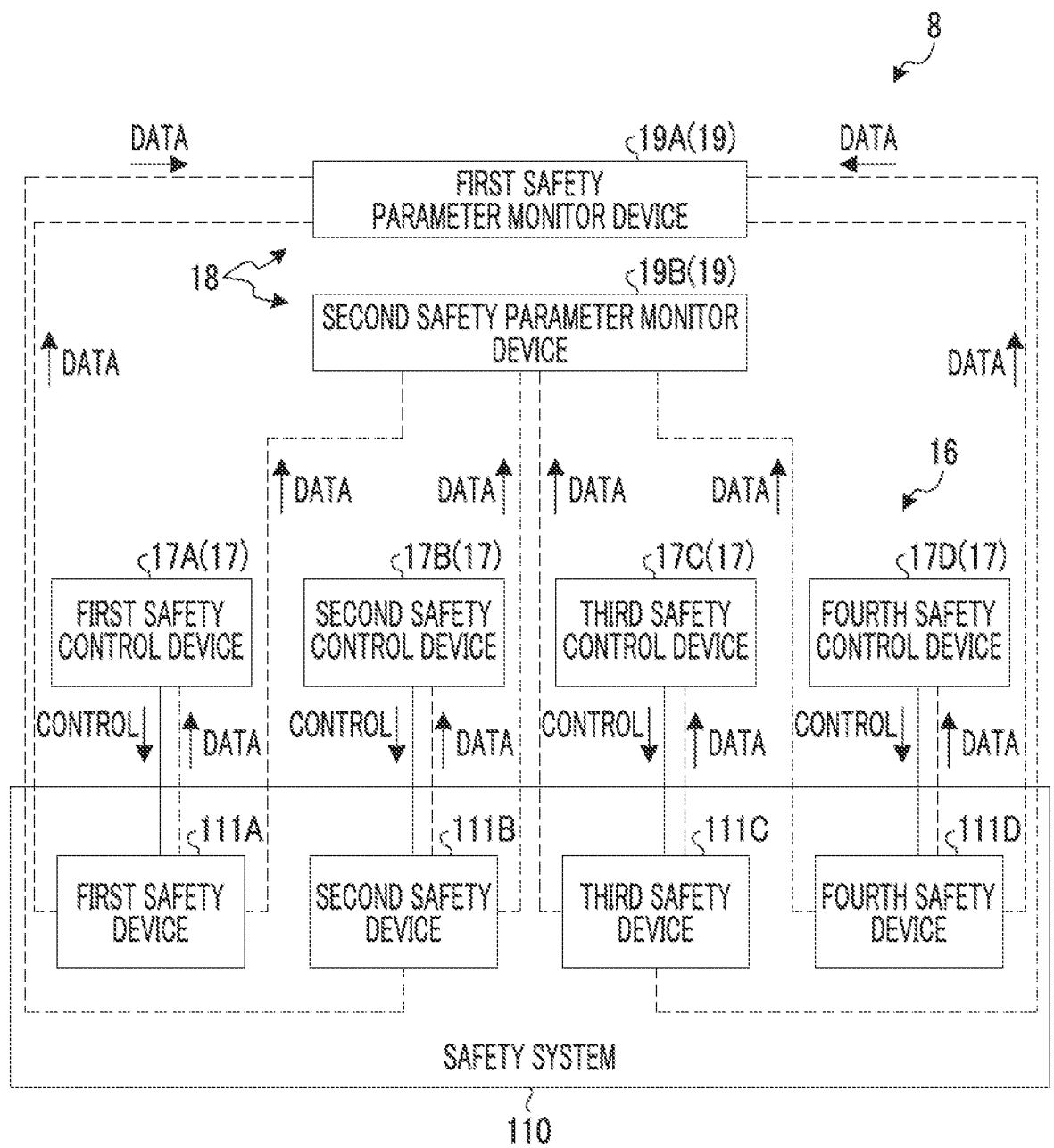
FIG. 9 is a block diagram showing a connection relationship between a safety control and monitoring system and a safety system.

Next, the safety control and monitoring system 8 will be described in detail. FIG. 9 is a block diagram showing a connection relationship between a safety control and monitoring system and a safety system. As described above, the safety system 110 is a system for safely stopping the nuclear power plant at the time of abnormality of the nuclear power plant. The safety control and monitoring system 8 monitors and controls the safety system 110, in a case where the safety system 110 cannot be monitored and controlled by the non-safety control system 6, due to an accident or the like. The safety system 110 includes a plurality of safety device 111 having the same function as each other. Respective safety devices 111 are individually controlled in lines which are different from each other. As shown in FIG. 9, in the description of the present embodiment, the safety system 110 includes a first safety device 111A, a second safety device 111B, a third safety device 111C, and a fourth safety device 111D, as a plurality of safety devices 111, and has four lines (four trains). However, the number of lines is not limited to four, and it is arbitrary as long as it is plural.

As shown in FIG. 9, the first safety control device 17A included in the safety control system 16 successively acquires data such as the state of each unit of the first safety device 111A and parameters thereof from the first safety device 111A, displays (monitors) the acquired data, and controls the operation of the first safety device 111A. Further, the second safety control device 17B successively acquires data such as the state of each unit of the second safety device 111B and parameters thereof from the second safety device 111B, displays (monitors) the acquired data, and controls the operation of the second safety device 111B. Further, the third safety control device 17C successively acquires data such as the state of each unit of the third safety device 111C and parameters thereof from the third safety device 111C, displays (monitors) the acquired data, and controls the operation of the third safety device 111C. Further, the fourth safety control device 17D successively acquires data such as the state of each unit of the fourth safety device 111D and parameters thereof from the fourth safety device 111D, displays (monitors) the acquired data, and controls the operation of the fourth safety device 111D. Hereinafter, in a case where the first safety control device 17A, the second safety control device 17B, the third safety control device 17C, and the fourth safety control device 17D are not distinguished, they are described as the safety control devices 17. In this way, the safety control system 16 includes one safety control device 17, for each train, that is, for each of the safety devices 111. The number of safety control devices 17 is the same as the number of safety devices 111. Since the respective safety devices 111 are individually controlled by the respective safety control devices 17 in lines which are different from each other, even if a failure occurs in one of them, other safety devices 111 operates in different lines, thereby suppressing the loss of function. The detailed configuration of the safety control device 17 will be described later.

As shown in FIG. 9, the first safety parameter monitor device 19A included in the safety parameter monitoring system 18 successively acquires and displays (monitors) the data of the respective safety devices 111 from a first safety device 111A, a second safety device 111B, a third safety device 111C, and a fourth safety device 111D. The first safety parameter monitor device 19A is a single device, and acquires and displays data of all the safety devices 111. The first safety parameter monitor device 19A displays data, but does not control the safety device 111. The second safety parameter monitor device 19B has the same function as that of the first safety parameter monitor device 19A. Even if a failure occurs in one of the first safety parameter monitor device 19A and the second safety parameter monitor device 19B, the other one operates, so the display function loss is suppressed. Hereinafter, when not distinguishing between the first safety parameter monitor device 19A and the second safety parameter monitor device 19B, they are described as the safety parameter monitor devices 19. The number of the safety parameter monitor devices 19 does not depend on the number of the safety devices 111, but the number thereof is arbitrary as long as it is plural. The detailed configuration of the safety parameter monitor device 19 will be described later.

Figure 10A:
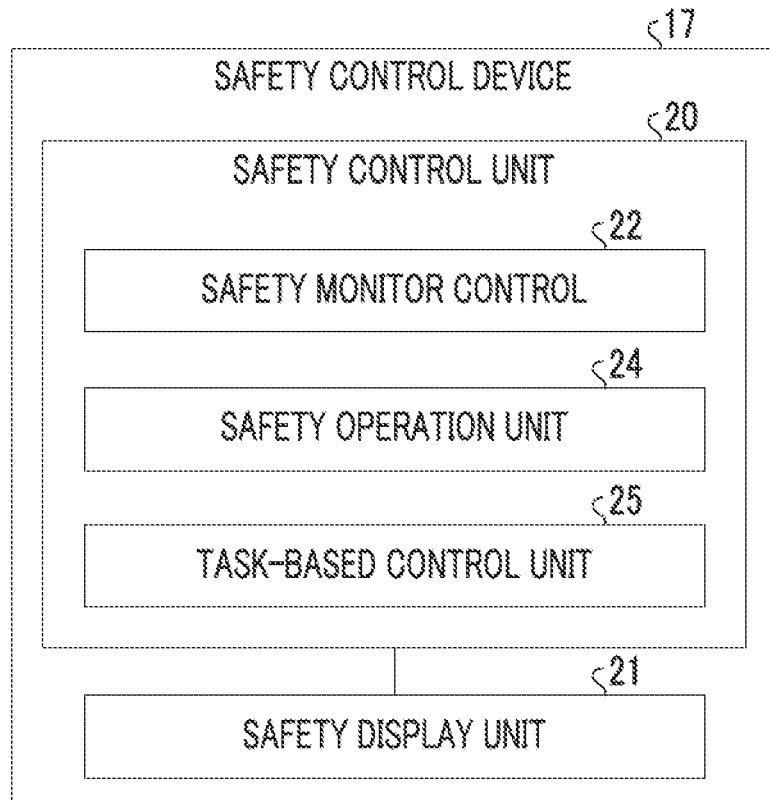
FIG. 10A is a block diagram showing a configuration of the safety control device.

FIG. 10A is a block diagram showing the configuration of the safety control device. The safety control device 17 is a visual display unit (VDU), and includes a safety control unit 20 and a safety display unit 21, as shown in FIG. 10A. The safety control unit 20 is a central processing unit (CPU), and operates as a safety monitor control unit 22, a safety operation unit 24, and a task-based control unit 25. The safety display unit 21 is an image display panel, and displays various data of the safety device 111 or displays a screen for controlling the operation of the safety device 111, under the control of the safety control unit 20. In addition, the safety display unit 21 is a touch panel, and detects the operation (touch) of an operator (worker). The safety control unit 20 controls the operation of the safety device 111 assigned to itself, based on the operation of the safety display unit 21 by the operator.

The safety monitor control unit 22 sequentially acquires data such as the state of each unit of the safety device 111 and parameters thereof from the safety device 111 assigned to itself, and displays the safety monitor window on the safety display unit 21. The safety monitor window is a window for displaying data such as the state of each unit of the safety device 111 and parameters thereof acquired by the safety monitor control unit 22. Specifically, in a case where the display of the safety monitor window is selected by the operator, the safety monitor control unit 22 displays the safety monitor window on the safety display unit 21. The safety monitor control unit 22 displays the parameter individually selected for the operator among the parameters of the safety device 111 in the safety monitor window. In this way, the safety monitor control unit 22 displays only parameters of the safety device 111 assigned to itself among the plurality of safety devices 111.

The safety operation unit 24 displays a safety operation window for controlling the operation of the safety device 111 assigned to itself, on the safety display unit 21. Specifically, in a case where the display of the safety operation window is selected by the operator, the safety operation unit 24 displays the safety operation window. The operator selects the component to be controlled out of the components in the safety device 111 from the safety operation window, and inputs the control contents. The safety operation unit 24 controls the operation of the selected component based on the input of the operator. In this way, the safety operation unit 24 controls only the safety device 111 assigned to itself among the plurality of safety devices 111.

The task-based control unit 25 displays a task window for controlling the operation of the safety device 111 assigned to itself, on the safety display unit 21, which will be described later in detail.

The operator selects the monitored or controlled safety device 111 from the plurality of safety control devices 111, and operates the safety control device 17 assigned to the selected safety device 111. The operator performs switching between screens (a safety monitor window, a safety operation window, and a task window) displayed on the safety control device 17, and performs monitoring or control of the selected safety device 111.

Figure 10B:
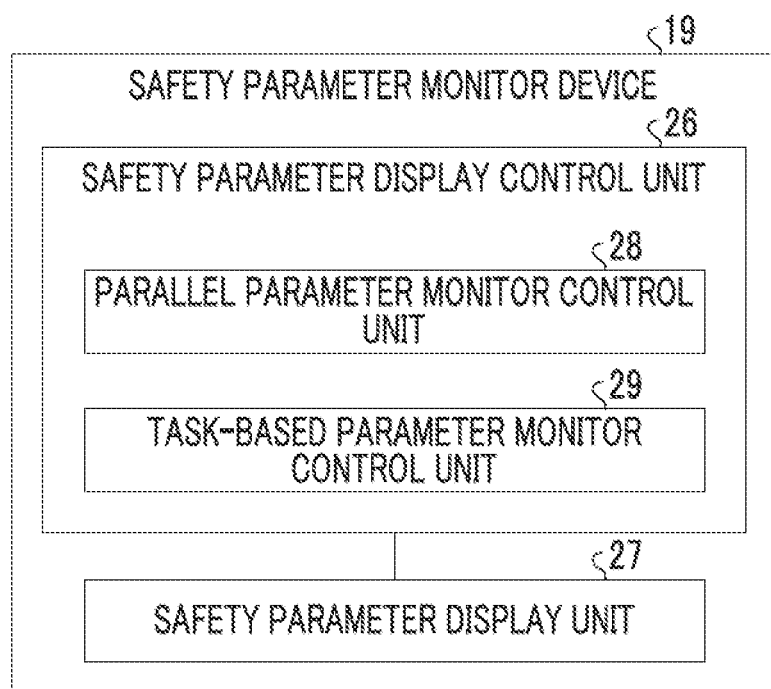
FIG. 10B is a block diagram showing a configuration of a safety parameter monitor device.

FIG. 10B is a block diagram showing the configuration of the safety parameter monitor device. The safety parameter monitor device 19 is a visual display unit (VDU), and includes a safety parameter display control unit 26 and a safety parameter display unit 27 as shown in FIG. 10B. The safety parameter display control unit 26 is a central processing unit (CPU), and operates as a parallel parameter monitor control unit 28 and a task-based parameter monitor control unit 29. The safety parameter display unit 27 is an image display panel, and sequentially displays (monitors) various data of the safety system 110 (all the safety devices 111) under the control of the safety parameter display control unit 26. In addition, the safety parameter display unit 27 is a touch panel, and detects the operation (touch) of an operator (worker).

The parallel parameter monitor control unit 28 sequentially acquires a safety parameter Pa which is the information on various parameters and the state of each unit, from all the safety devices 111, and displays a parallel parameter window on the safety parameter display unit 27. The parallel parameter window is a window for displaying the safety parameter Pa obtained by the safety monitor control unit 22. In other words, the parallel parameter monitor control unit 28 collectively (spatially dedicated continuous visible) displays all of the safety parameters Pa of the safety system 110 (all the safety devices 111) on one screen of the safety parameter display unit 27. The parallel parameter monitor control unit 28 displays a parallel parameter window on the safety parameter display unit 27, in a case where the display of the parallel parameter window is selected by the operator.

The task-based parameter monitor control unit 29 sequentially acquires the safety parameter Pa from all the safety devices 111, and displays a task parameter window on the safety parameter display unit 27. The task parallel parameter window is a window for displaying the safety parameter Pa obtained by the task-based parameter monitor control unit 29. The task parallel parameter monitor control unit 29 displays a task parameter window on the safety parameter display unit 27, in a case where the display of the task parameter window is selected by the operator.

As described above, the safety parameter monitor device 19 displays the safety parameter Pa of all the safety devices 111. The operator performs switching between screens (the parallel parameter window and the task parameter window) displayed on the safety control device 17, and monitors all the safety devices 111.

Note that the safety parameter Pa specifically refers to a parameter affecting a plant safety function required to maintain the critical safety function (CSF) of the nuclear power plant, such as maintenance of core cooling and maintenance of retained water. The type of the safety parameter Pa is predetermined. The safety function is specified in for example, "IAEA Safety Standards Severe Accident Management Programmes for Nuclear Power Plants No. NS-G-2.15".

Hereinafter, the parallel parameter window, the task parameter window, and the task window will be described in detail.

(Parallel Parameter Window)

Figure 11:
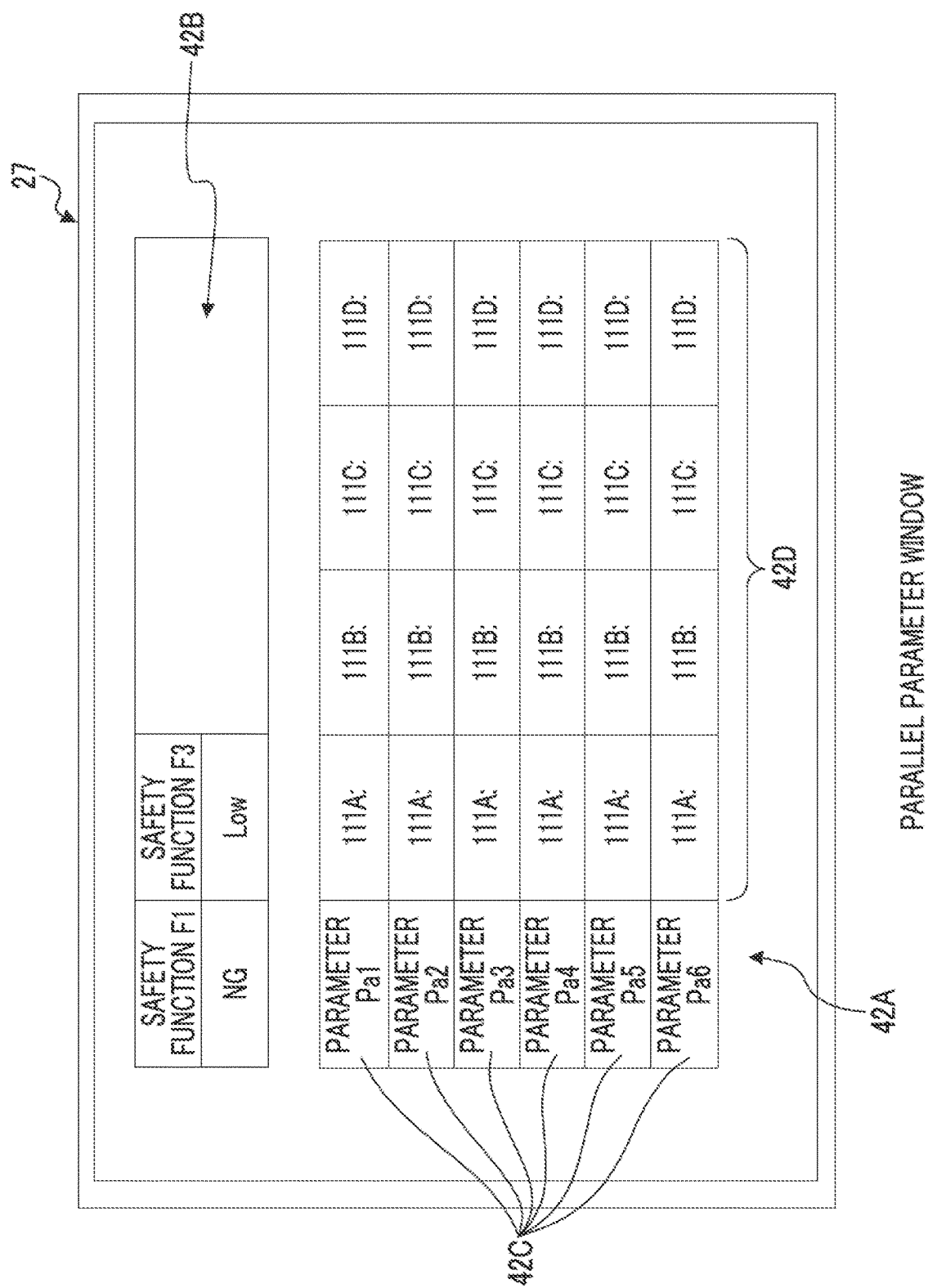
FIG. 11 is an explanatory diagram for explaining an example of display of a parallel parameter window.

FIG. 11 is an explanatory diagram for explaining an example of display of a parallel parameter window. The parallel parameter monitor control unit 28 displays the parallel parameter window on the safety parameter display unit 27. As shown in FIG. 11, the parallel parameter window displays a parallel parameter image 42A representing the safety parameter Pa, and a safety function parameter display image 42B.

The parallel parameter image 42A is an image displayed on almost the entire image display surface of the safety parameter display unit 27. The parallel parameter monitor control unit 28 displays the latest value of the safety parameter Pa as the parallel parameter image 42A, for each type of the safety parameter Pa and for each of the safety devices 111, side by side. In the example of FIG. 11, in the parallel parameter image 42A, the safety parameter Pa is displayed in the form of a table. In the parallel parameter image 42A, safety parameter type images 42C indicating the name of the types of the safety parameters Pa (parameters Pa1, Pa2, Pa3, Pa4, Pa5, and Pa6) are displayed in a row. Further, safety parameter value image 42D, in which the value of each the safety parameter Pa is sequentially updated and represented, is arranged and displayed adjacent to each safety parameter type image 42C, in the row direction for each safety-related device 111. In the example of FIG. 11, the value of parameter Pa1 of the first safety device 111A, the value of parameter Pa1 of the second safety device 111B, the value of parameter Pa1 of the third safety device 111C, and the value of parameter Pa1 of the fourth safety device 111D are displayed as the safety parameter value image 42D, on the same row as the safety parameter type image 42C which is the parameter Pa1.

As described above, the type of the safety parameter Pa is predetermined. The parallel parameter image 42A displays all the safety parameters Pa related to the CSF (safety function). The parallel parameter display control unit 28 displays safety parameters Pa in order from top to bottom in the column direction, from the most important parameter for safety of the nuclear power plant. Further, the parallel parameter display control unit 28 displays all the safety parameters Pa on one screen, on the safety parameter display unit 27. The parallel parameter display control unit 28 may display only the pre-selected safety parameter Pa, among all the safety parameters Pa.

In addition, the parallel parameter monitor control unit 28 displays the safety parameter Pa, which does not have a normal value or is not in a normal state, that is, has an abnormal value or is in an abnormal state, among the safety parameters Pa displayed as the parallel parameter image 42A so as to distinguish from a normal safety parameters Pa. In the present embodiment, the parallel parameter monitor control unit 28 highlights the safety parameter value image 42D representing an abnormal value and state with a color different from that of a normal one, such as yellow or red.

The safety function parameter display image 42B is an image displayed at the top of the parallel parameter image 42A. In a case where the safety parameter Pa, which affects each safety function (maintenance of core cooling, maintenance of retained water, or the like) displayed as the parallel parameter image 42A, indicates an abnormal state, the parallel parameter monitor control unit 28 displays the type of each safety function (maintenance of core cooling, maintenance of retained water, or the like) affected by the abnormal state with an abnormal or normal state, as the safety function parameter display image 42B. For example, in the example of FIG. 11, it is indicated that the states of the parameters Pa1 and Pa3 are abnormal, the state of the safety function F1 (for example, maintenance of the core cooling) corresponding to the parameter Pa1 is NG, and the state of the safety function F3 (for example, maintenance of retained water) corresponding to the parameter Pa3 is Low which is a state lower than normal.

(Task Parameter Window)

Figure 12:
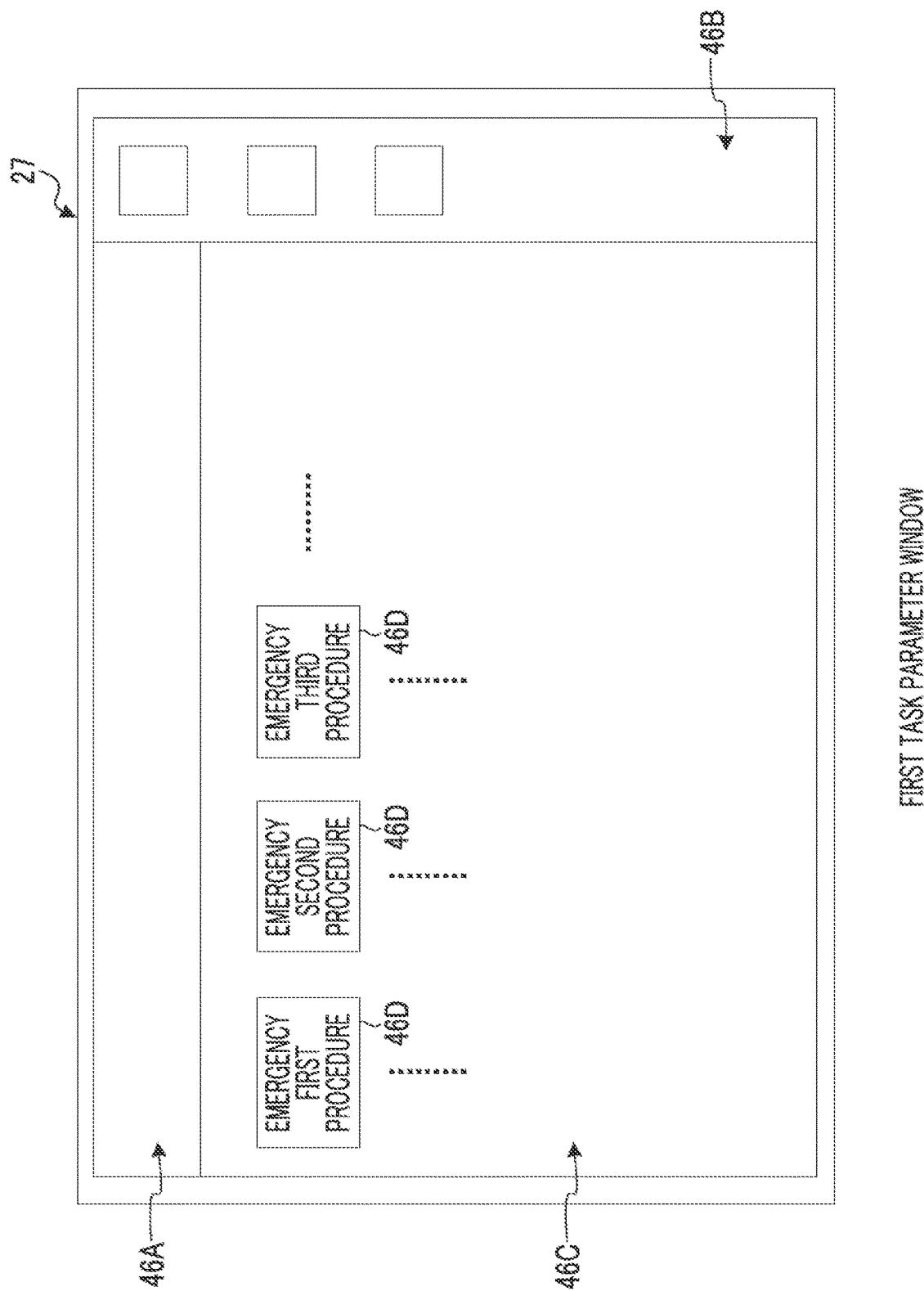
FIG. 12 is a diagram showing an example of a first task parameter window.

Next, the task parameter window will be described in detail. The task-based parameter monitor control unit 29 performs switching between the first task parameter window and the second task parameter window, which will be described later, as a task parameter window, and displays the switched task parameter window on the safety parameter display unit 27. FIG. 12 is a diagram showing an example of a first task parameter window. If the task parameter window is selected by the operator, the task-based parameter monitor control unit 29 displays the first task parameter window on the safety parameter display unit 27. As shown in FIG. 12, the first task parameter window is a menu screen, and displays a title image 46A, an operation button image 46B, and a menu image 46C. The title image 46A is an image displayed at the top of the screen, and displays the name of the first display (for example, "task parameter menu screen"). The operation button image 46B is an image displayed on the side of the screen, and displays various operation buttons for controlling the display. The menu image 46C is an image displayed on almost the entire screen below the title image 46A, and displays a plurality of procedure images 46D. The procedure image 46D is an image that displays the serial number of the emergency procedure and the name (contents) of the emergency procedure. The procedure image 46D is a button display for selecting an emergency procedure in which a serial number is described. The emergency procedure is an operation procedure for safely stopping the nuclear power plant at the time of abnormality of the nuclear power plant. A plurality of emergency procedures are prepared according to the operation contents. In the example of FIG. 12, a plurality of procedure images 46D display an emergency first procedure, an emergency second procedure, and an emergency third procedure, respectively.

Figure 13:
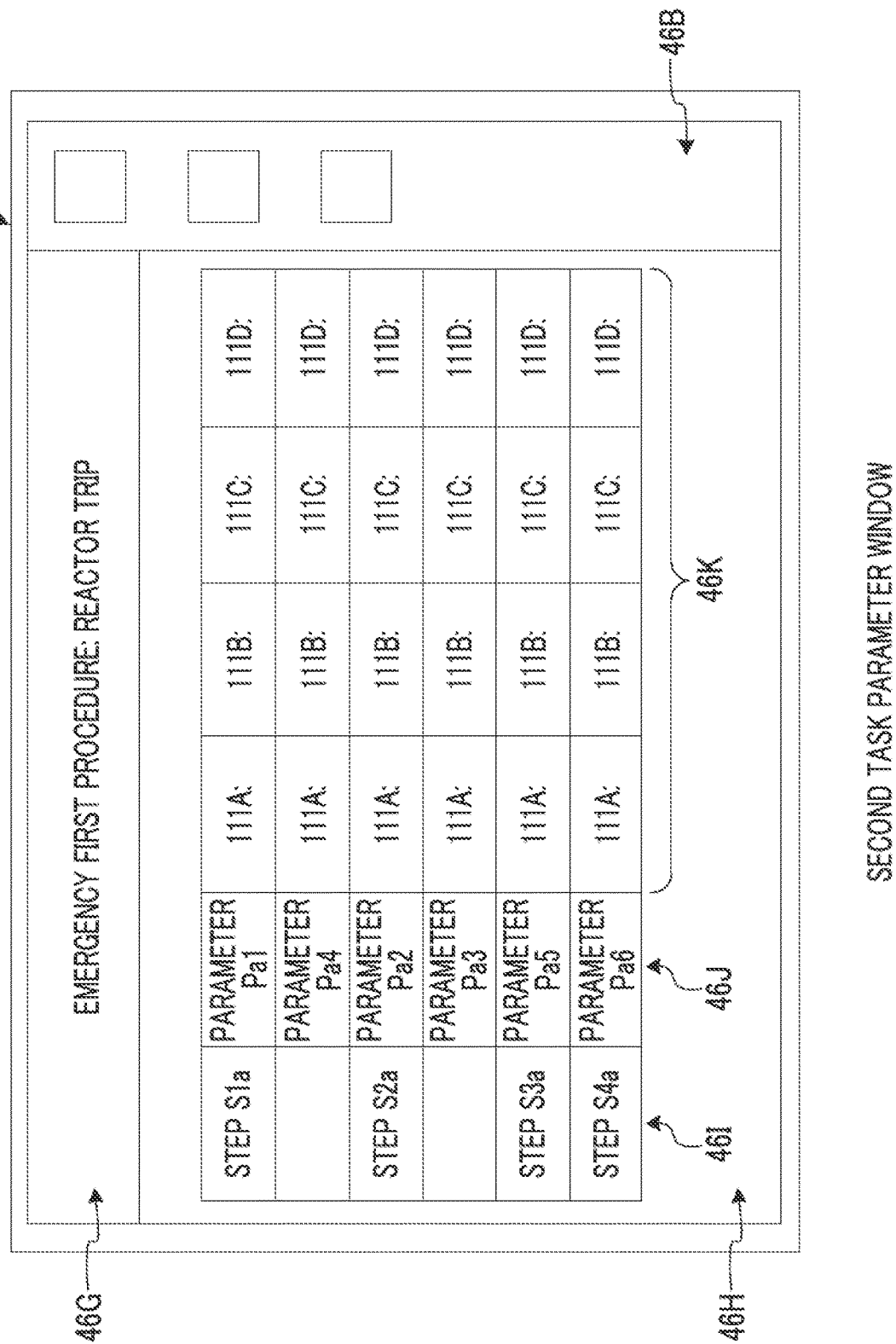
FIG. 13 is a diagram showing an example of a second task parameter window.

FIG. 13 is a diagram showing an example of a second task parameter window. The task-based parameter monitor control unit 29 changes the display from the first task parameter window to the second task parameter window, when detecting the selection of the procedure image 46D by the operator, that is, the touch of the procedure image 46D by the operator. As shown in FIG. 13, the safety parameter display unit 27 displays the operation button image 46B, the title image 46G, and the task parameter image 46H on the image display surface in the second task parameter window.

The title image 46G is an image displayed at the top of the screen, and displays the serial number of the selected emergency procedure and the contents of the emergency procedure. In the example of FIG. 13, the emergency first procedure is selected, and in the title image 46G, "emergency first procedure" which is the serial number and "reactor trip" which is the content of the first emergency procedure are displayed.

The task parameter image 46H is an image displayed on almost the entire surface of the screen below the title image 46G. The task parameter image 46H displays the safety parameter Pa, for each procedure step of the emergency operation procedure and for each of the safety devices 111, side by side. In the example of FIG. 13, in the task parameter image 46H, the safety parameter Pa is displayed in the form of a table. In the task parameter image 46H, a step image 46I, a safety parameter type image 46J, and a safety parameter value image 46K are displayed. The step image 46I is an image displaying the procedure steps of the emergency operation procedure sequentially in the column direction. The safety parameter type image 46J is an image displayed adjacent to the step image 46I. The safety parameter type image 46J displays the type (name) of the safety parameter Pa related to the procedure step displayed in the step image 46I in association with the procedure step of the step image 46I. The safety parameter value image 46K is an image displayed adjacent to the safety parameter type image 46J, and is displayed while the value of each the safety parameter Pa is sequentially updated. Further, the safety parameter Pa related to the procedure step is various parameters to be controlled in the procedure step, parameters which change by executing the procedure step, and the like.

In the example of FIG. 13, the procedure steps of the first emergency procedure are steps S1a, S2a, S3a, and S4a. The task parameter display unit 46 displays the steps S1a, S2a, S3a, and S4a in order from the top in the column direction as a step image 46I. Then, the task parameter display unit 46 displays parameters Pa1, Pa2, Pa3, Pa4, Pa5, and Pa6 as a safety parameter type image 46J. The safety parameter Pa related to step S1a is parameters Pa1 and Pa4, the safety parameter Pa related to step S2a is parameters Pa2 and Pa3, the safety parameter Pa related to step S3a is a parameter Pa5, and the safety parameter Pa related to step S4a is a parameter Pa6. The safety parameter display unit 27 displays the parameter Pa1 adjacent to the display of step S1a, and displays the parameter Pa4 on the next row. Further, the safety parameter display unit 27 displays step S2a on the next row of the parameter Pa4, and displays the parameter Pa2 adjacent thereto. By displaying such an arrangement, the safety parameter display unit 27 displays the safety parameter Pa related to each procedure step in association with the procedure step.

Further, in the example of FIG. 13, the safety parameter display unit 27 sequentially updates and displays the value of the parameter Pa1 of the first safety device 111A, the value of the parameter Pa1 of the second safety device 111B, the value of the parameter Pa1 of the third safety device 111C, and the value of the parameter Pa1 of the fourth safety device 111D, as the safety parameter value image 46K, on the same row as the safety parameter type image 46J which is the parameter Pa1. The operator views the second task parameter window to check the parameter related to the procedure step to be executed. By the operator operating the button of the operation button image 46B, switching to a task parameter image 46H representing another procedure step (for example, a subsequent step S5a) and the safety parameter Pa related thereto is made.

The operator performs switching between the parallel parameter window and the task parameter window, described above, as necessary, and displays the switched window, on the safety parameter monitor device 19.

(Task Window)

Figure 14:
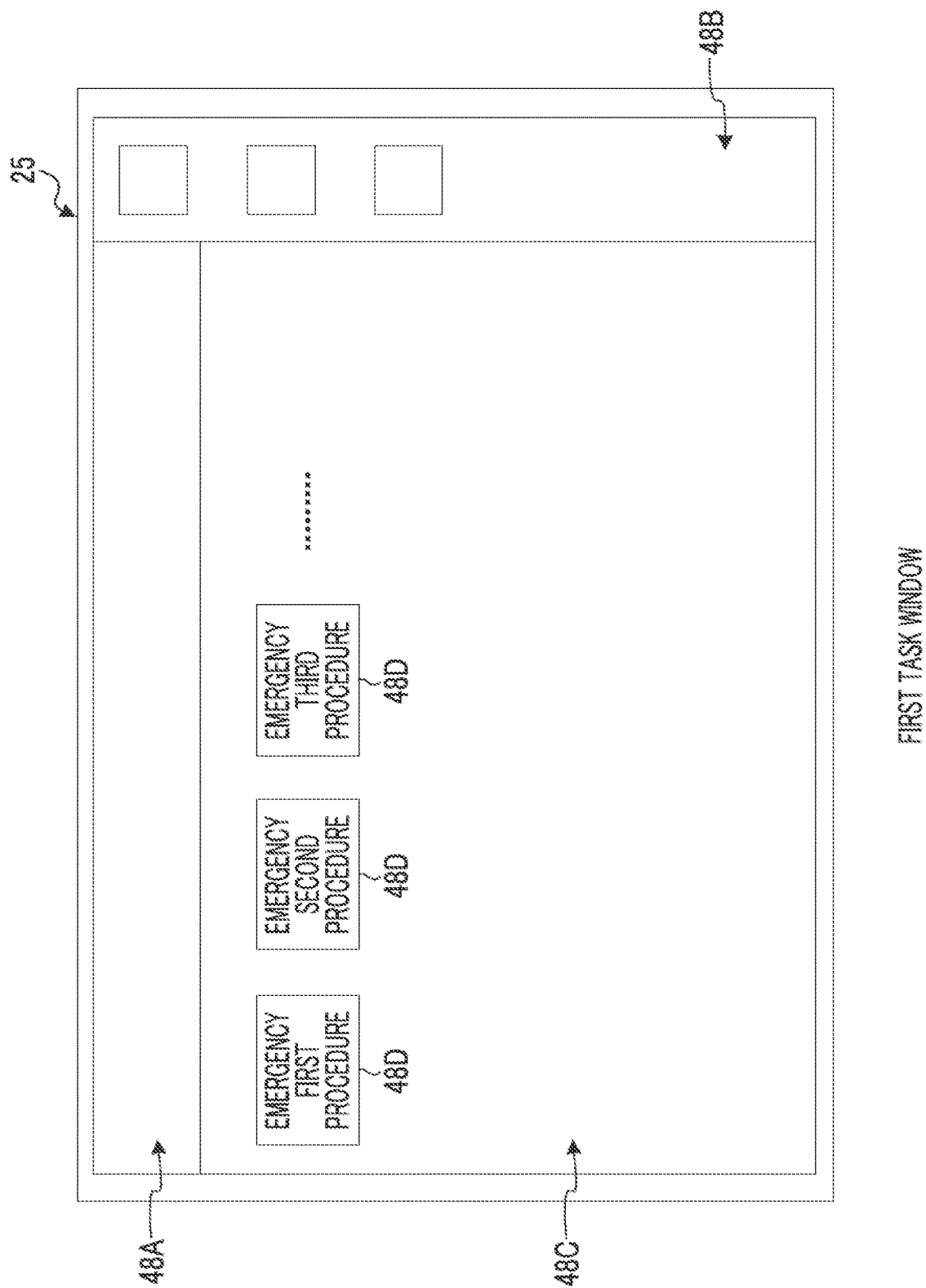
FIG. 14 is a diagram showing an example of a first task window.

Next, the task window will be described in detail. The task-based control unit 25 performs switching between the first task window, the second task window, and the third task window, which will be described later, as a task window, and displays the switched window on the safety display unit 21. FIG. 14 is a diagram showing an example of a first task window. When the task window is selected by the operator, the task-based control unit 25 displays the first task window on the safety display unit 21. As shown in FIG. 14, the first task window is a menu screen, and displays a title image 48A, an operation button image 48B, and a menu image 48C. The title image 48A is an image displayed at the top of the screen, and displays the name of the first task window (for example, "task menu screen"). The operation button image 48B is an image displayed on the side of the screen, and displays various operation buttons. The menu image 48C is an image displayed on almost the entire screen below the title image 48A, and displays a plurality of procedure images 48D. The procedure image 48D is an image that displays the serial number of the emergency procedure and the content of the emergency procedure. The procedure image 48D is a button display for selecting an emergency procedure in which a serial number or a name is described. In the example of FIG. 14, a plurality of procedure images 48D display an emergency first procedure, an emergency second procedure, and an emergency third procedure, respectively. In this way, the display content of the first task window in the example of FIG. 14 is common to the display content of the first task parameter window in the example of FIG. 12.

Figure 15:
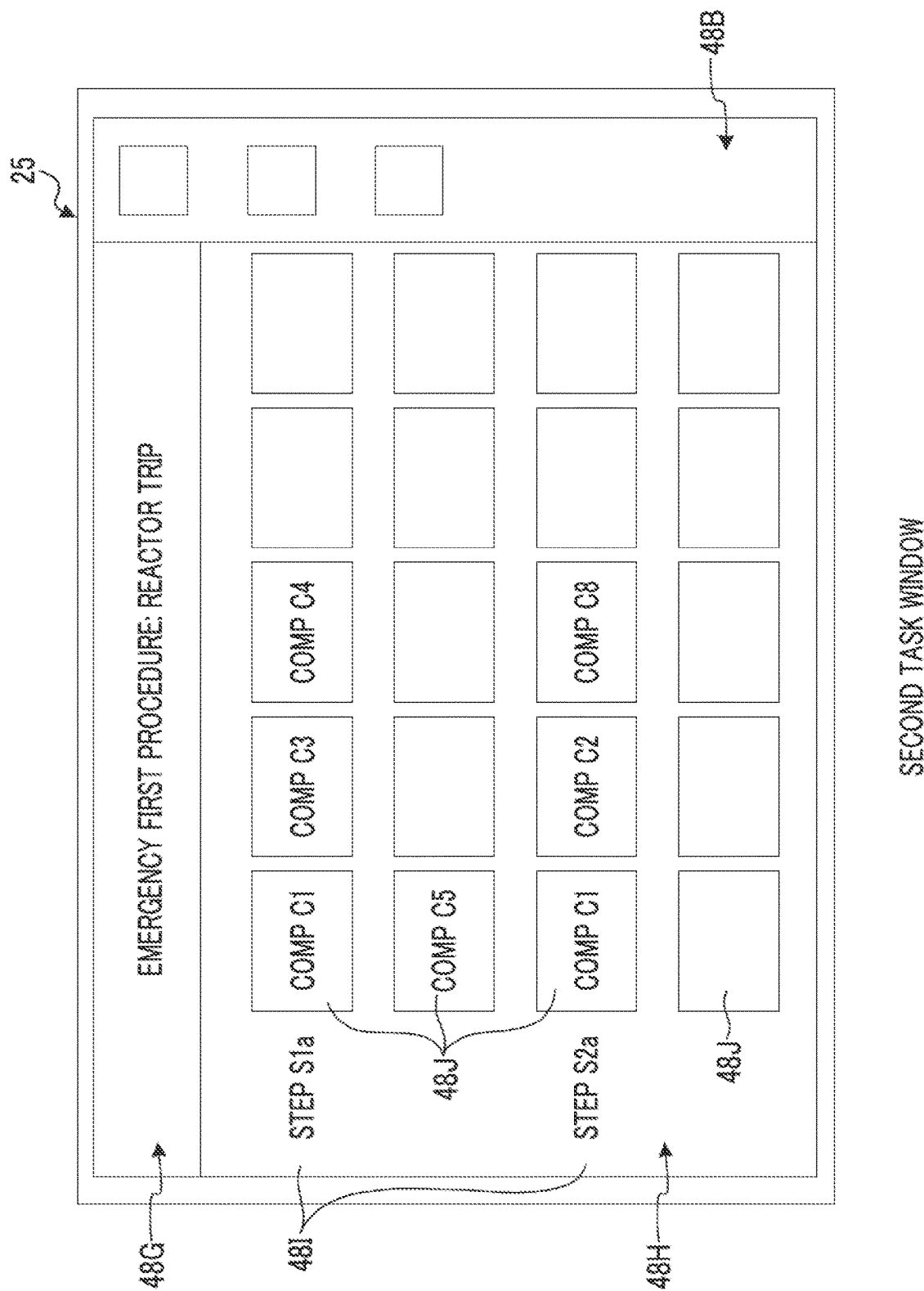
FIG. 15 is a diagram showing an example of a second task window.

FIG. 15 is a diagram showing an example of the second task window. The task-based control unit 25 changes the display from the first task window to the second task window when detecting the selection of the procedure image 48D by the operator, that is, the touch operation on the procedure image 48D by the operator. The safety device 111 includes a plurality of components, and the second task window is a screen for selecting a component that needs to be controlled in the emergency procedure selected in the first task window. As shown in FIG. 15, the safety display unit 21 displays an operation button image 48B, a title image 48G, and an operation target image 48H on the image display surface, in the second task window.

The title image 48G is an image displayed at the top of the screen, and displays the serial number of the selected emergency procedure and the contents of the emergency procedure. In the example of FIG. 15, the emergency first procedure is selected, and in the title image 48G, the character "emergency first procedure" which is the serial number and the character "reactor trip" which is the content of the emergency first procedure are displayed.

The task parameter image 48H is an image displayed on almost the entire surface of the screen below the title image 48G. The operation target image 48H displays the component to be operated among the components included in the safety device 111 for each procedure step of the emergency procedure. In the example of FIG. 15, the step image 48I and the target device image 48J are displayed in the operation object image 48H. The step image 48I is an image displaying the procedure step numbers of the emergency operation procedures in order in the column direction. The target device image 48J is an image displayed adjacent to the step image 48I. The target device image 48J displays the name of the component that needs to be operated in the procedure step displayed in the step image 48I in association with the procedure step displayed in the step image 48I. The target device image 48J is button display for activating a component of which name is displayed.

In the example of FIG. 15, the safety display unit 21 displays the steps S1*a* and S2*a* out of the procedure steps of the first emergency procedure, as a step image 48I. Then, the safety display unit 21 displays, as the target device image 48J, components COMP C1, COMP C3, COMP C4, and the like which are required to be operated in step S1*a*, adjacent to the display of step S1*a*. In the next row following the display of step S1*a*, COMP C5 or the like, which is a component required to be operated in step S1*a*, is displayed. The safety display unit 21 displays step S2*a* as the step image 48I on the next row of the display of the COMP C5, and displays the COMP C1, COMP C2, COMP C8, or the like which are components required to be operated in step S2*a*, adjacent to the display. By displaying in such an arrangement, the safety display unit 21 displays components required to be operated in each procedure step in association with the procedure step. By the operator operating the button of the operation button image 48B, switching to an operation target image 48H representing another procedure step (for example, the subsequent step S3*a*) and components related thereto is performed.

Figure 16:
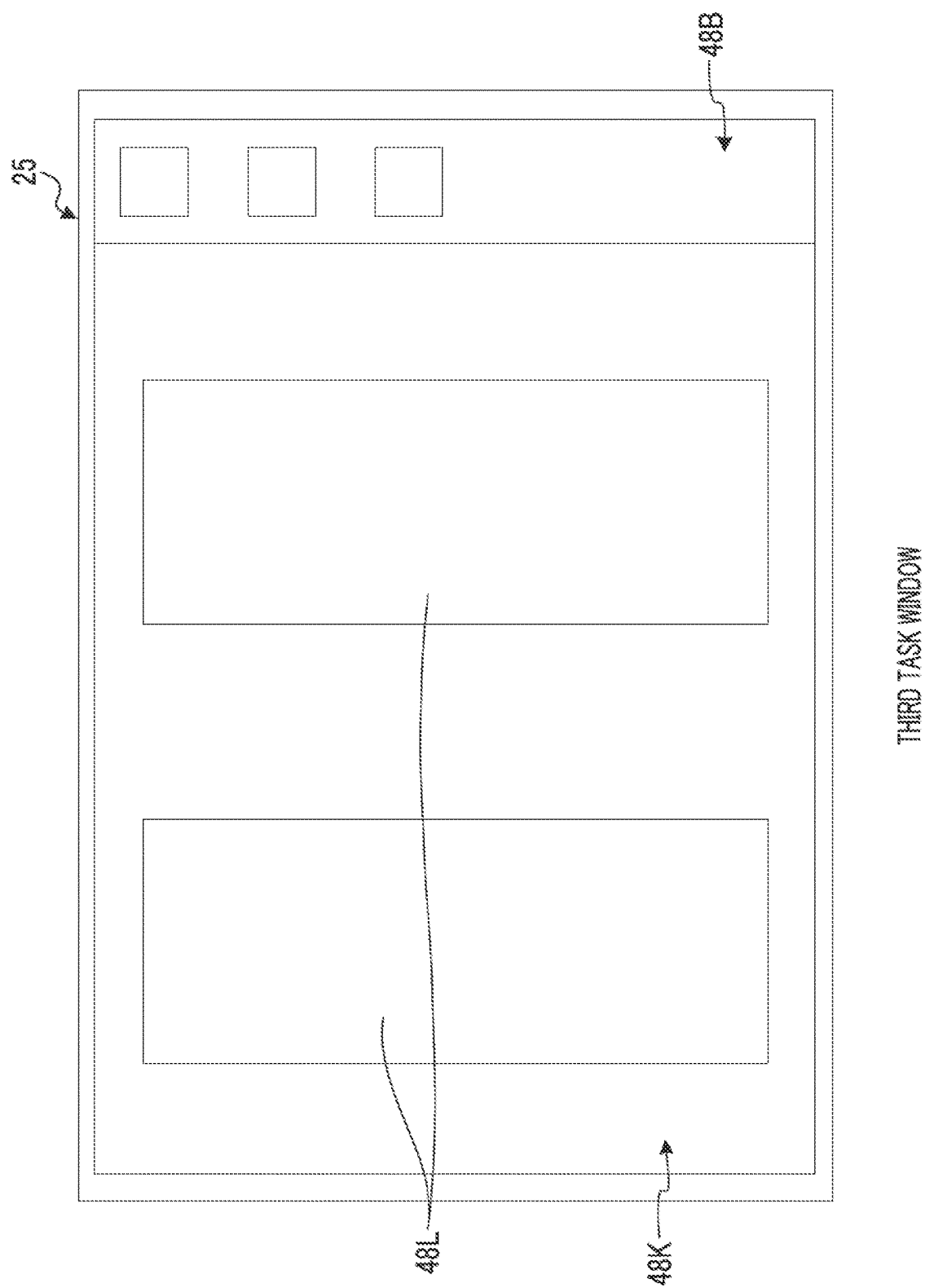
FIG. 16 is a diagram showing an example of a third task window.

FIG. 16 is a diagram showing an example of the third task window. The task-based control unit 25 changes the display from the second task window to the third task window, when detecting the selection of the target device image 48J by the operator, that is, the touch operation on the target device image 48J by the operator. The third task window is a screen for controlling the component selected in the second task window. As shown in FIG. 16, the safety display unit 21 displays an operation button image 48B and a control image 48K on the image display surface, in the third task window.

The control image 48K displays a control button image 48L. The control button image 48L is an image displaying a switch or a controller for controlling the selected component. When detecting a touch operation on the control button image 48L by the operator, the task-based control unit 25 controls the operation of the selected component based on the operation. For example, in a case where the selected component is an opening/closing valve and an operation of closing the valve on the control button image 48L is input, the task-based control unit 25 issues a command to close the opening/closing valve, and closes the opening/closing valve.

As described above, the safety control device 17 displays in the second task window, the components that need to be controlled in the procedure step to be executed. On the other hand, the safety parameter monitor device 19 displays the safety parameter Pa related to the procedure step to be executed, in the second task parameter window. Therefore, when executing the procedure step, the worker selects the component that needs to be controlled in the second task window while monitoring related the safety parameter Pa in the second task parameter window, and can control the operation of the component in the third task window.

(Control Process of Task-Based Control Unit and Task-Based Parameter Monitor Control Unit)

Next, a control flow of the safety system 110 at the time of abnormality, using the above-described safety control and monitoring system 8 will be described. At the time of abnormality of the nuclear power plant, the worker controls the operation of safety system 110 according to the emergency procedure corresponding to the operation contents to safely stop the nuclear power plant. In this case, the worker monitors the safety parameter Pa of the safety system 110 by using the task parameter window displayed by the task-based parameter monitor control unit 29, and operates the task window displayed by the task-based control unit 25 to execute each procedure step of the emergency procedure.

Figure 17:
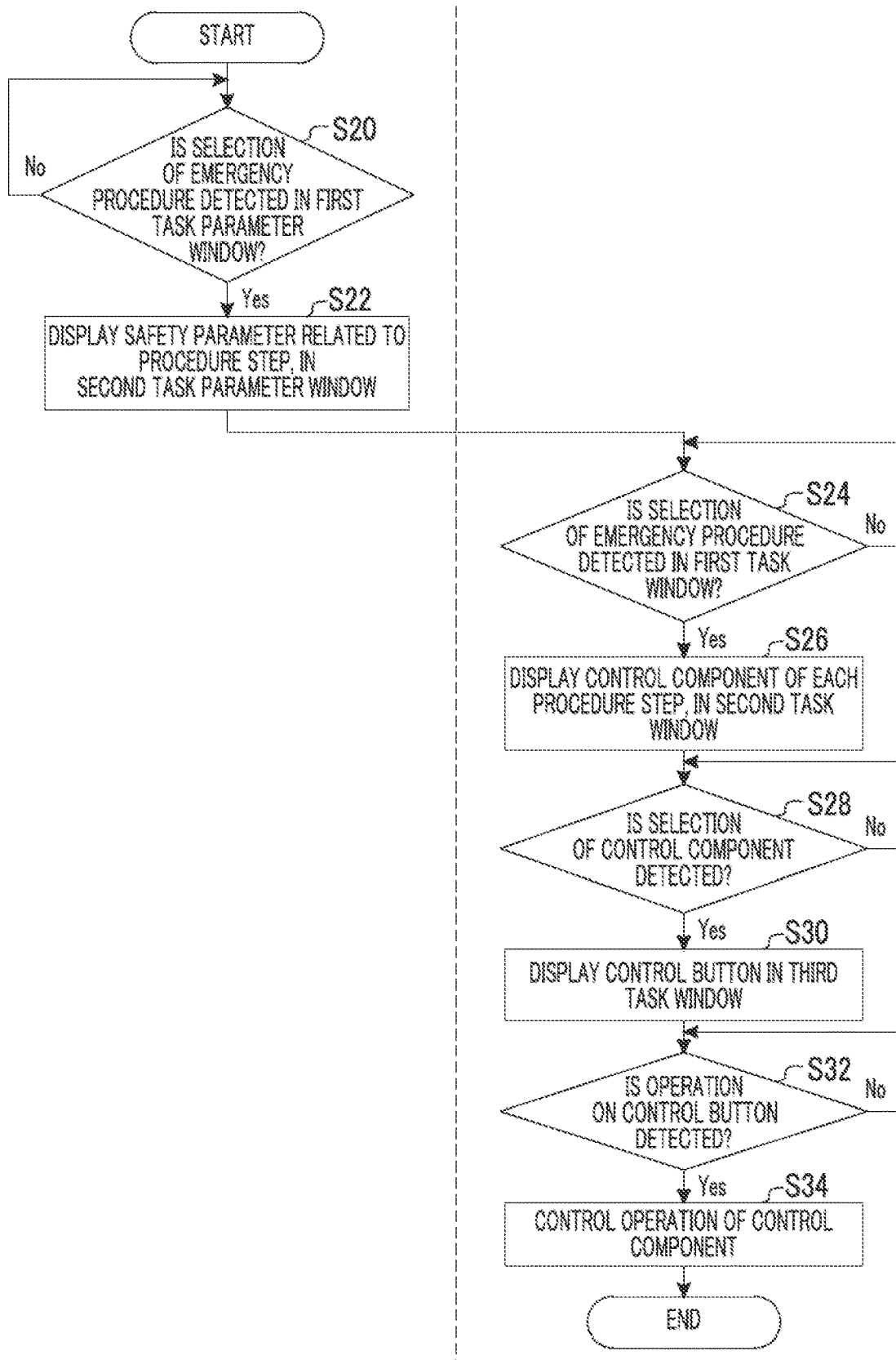
FIG. 17 is a flowchart showing a control flow of the safety system by the task-based parameter monitor control unit and task-based control unit.

The control flow of the safety system 110 by the task-based control unit 25 and the task-based parameter monitor control unit 29 will be described below. FIG. 17 is a flowchart showing a control flow of the safety system by the task-based parameter monitor control unit and task-based control unit. When controlling the operation of the safety system 110 at the time of abnormality of the nuclear power plant, the worker selects the task parameter window in the safety parameter monitor device 19 and displays the first task parameter window on the task-based parameter monitor control unit 29. Then, as shown in FIG. 17, the task-based parameter monitor control unit 29 determines whether or not the selection (touch operation) of the emergency procedure by the worker is detected, in the first task parameter window (step S20). In a case where the selection of the emergency procedure is detected (step S20; Yes), the task-based parameter monitor control unit 29 switches the display to the second task parameter window, and displays the safety parameter Pa related to the procedure step of the selected emergency procedure in the second task parameter window (step S22). If the selection of the emergency procedure is not detected (step S20; No), the task-based parameter monitor control unit 29 returns to step S20 and continues to detect the selection of the emergency procedure.

After step S22, the worker selects a safety device 111 to be controlled from among the plurality of safety devices 111, based on the safety parameter Pa displayed in the second task parameter window. The worker selects the task window in the safety control device 17 which controls the selected safety device 111, and causes the task-based control unit 25 to display the first task window. The task-based control unit 25 determines whether or not the selection (touch operation) of the emergency procedure by the worker is detected in the first task window (step S24). In a case where the selection of the emergency procedure is detected (step S24; Yes), the task-based control unit switches the display to the second task window and display the control component of each procedure step of the selected emergency procedure in the second task window (step S26). The control component of the procedure step is a component that needs to be controlled to execute the procedure step. In a case where selection of the emergency procedure is not detected (step S24; No), the task-based control unit 25 returns to step S24 and continues to detect the selection of the emergency procedure.

After displaying the control component for each procedure step in the second task window, the task-based control unit 25 determines whether or not the selection (touch operation) of the control component by the worker is detected (step S28). In a case where the selection of the control component is detected (step S28; Yes), the task-based control unit 25 switches the display to the third task window, and displays the control button image 48L for controlling the selected control component in the third task window (step S30). In a case where the selection of the control component is not detected (step S28; No), the task-based control unit 25 returns to step S28, and continues to detect the selection of the control component.

After displaying the control button image 48L, the task-based control unit 25 determines whether or not an operation on the control button image 48L by the worker is detected (step S32). In a case where the operation on the control button image 48L is detected (step S32; Yes), the task-based control unit 25 controls the operation of the control component, based on the operation on the control button image 48L (step S34). As a result, this control ends. Further, in a case where an operation on the control button image 48L is not detected (step S32; No), the process returns to step S32, and operation detection on the control button image 48L is continued.

At the time of abnormality of the nuclear power plant, the worker controls the safety device 111, using the task-based control unit 25 (the safety control device 17) and the task-based parameter monitor control unit 29 (the safety parameter monitor device 19) in this way. In a case where the worker desires to collectively monitor all the safety parameters Pa of all the safety devices 111, the worker selects a parallel parameter window on the safety parameter monitor device 19 to cause the parallel parameter monitor control unit 28 to display the parallel parameter window, and monitors all the safety parameters Pa.

As described above, the safety control and monitoring system 8 according to the present embodiment is disposed in the main control room 2 of the nuclear power plant including a plurality of safety devices 111. The safety control and monitoring system 8 includes a parallel parameter monitor control unit 28 and a task-based parameter monitor control unit 29. The parallel parameter monitor control unit 28 displays the safety parameters Pa, for each type of the safety parameter Pa and for each of the plurality of safety devices 111, side by side. The task-based parameter monitor control unit 29 displays the safety parameters Pa, for each procedure step of the emergency operation procedure and for each of the plurality of safety devices 111, side by side.

According to the safety control and monitoring system 8, when controlling the safety device 111 according to the procedure step of the emergency operation procedure, the worker can proceed with control while checking the safety parameter Pa related to the procedure step to be executed, by the task-based parameter monitor control unit 29. Furthermore, in a case where the safety device 111 needs to be controlled with a procedure other than the determined emergency operation procedure, or in a case where the worker checks all the safety parameters Pa, the worker can proceed with control of the safety device 111 while checking important the safety parameter Pa, by the parallel parameter monitor control unit 28. Therefore, according to the safety control and monitoring system 8, the task-based parameter monitor control unit 29 is operated when the emergency procedure is executed, and the parallel parameter monitor control unit 28 is operated in a case where control other than the emergency operation procedure is performed or all the safety parameters Pa are checked, so it is possible to reduce the burden of monitoring in both cases.

Further, the safety control and monitoring system 8 includes a safety parameter monitor device 19 and a safety control device 17. The safety parameter monitor device 19 includes a task-based parameter monitor control unit 29 and a safety parameter display unit 27. The safety control device 17 includes a task-based control unit 25 that controls the operation of each unit of the safety device 111 when executing the emergency operation procedure. The task-based parameter monitor control unit 29 displays parameters of the safety device 111 related to a procedure step of an emergency operation procedure executed by the task-based control unit 25, as the safety parameter Pa, on the safety parameter display unit 27. According to the safety control and monitoring system 8, the safety parameter monitor device 19 displays the safety parameter Pa related to the procedure step to be executed by the safety control device 17. Therefore, according to the safety control and monitoring system 8, it is possible to reduce the burden of monitoring the safety parameter Pa by the worker, at the time of executing the emergency operation procedure by the safety control device 17.

In the present embodiment, the safety control device 17, which is one device, includes a safety monitor control unit 22 and a safety operation unit 24, and a task-based control unit 25. Then, by the safety control device 17, the safety monitor window displayed by the safety monitor control unit 22, the safety operation window displayed by the safety operation unit 24, and the task window displayed by the task-based control unit 25 are switched and displayed with one screen (the safety display unit 21).

In the present embodiment, the safety parameter monitor device 19, which is one device, includes a parallel parameter monitor control unit 28 and a task-based parameter monitor control unit 29. Then, on the safety parameter monitor device 19 switches the parallel parameter window displayed by the parallel parameter monitor control unit 28 and the task parameter window displayed by the task-based parameter monitor control unit 29 to one screen and displays it (safety parameter display unit 27).

(Large Display Device, Non-Safety Control Device, and Supervisory Auxiliary Display Device)

Next, the large display device 4, the non-safety control device 10, and the supervisory auxiliary display device 15 will be described in detail. As described above, in the large display device 4, the large display panel control unit 4B acquires the state of each unit of the non-safety system 100 and parameters thereof from the non-safety system 100, and displays the predetermined main parameter Pb among the acquired parameters and the like on the large display panel 4A (see FIG. 3). The main parameter Pb is an important parameter for normal operation of the nuclear power plant.

Figure 18:
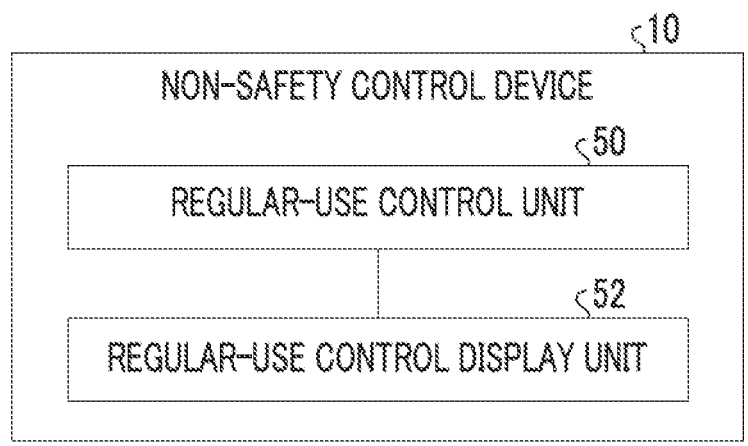
FIG. 18 is a block diagram showing a configuration of a non-safety control device.

FIG. 18 is a block diagram showing a configuration of a non-safety control device. As shown in FIG. 18, the non-safety control device 10 includes a non-safety control unit 50 and a non-safety control display unit 52. The non-safety control display unit 52 monitors various parameters of the non-safety system 100, and displays a screen for controlling the operation of the non-safety system 100. The non-safety control display unit 52 is a touch panel, and detects an operation (touch or the like) of the operator (worker). The non-safety control unit 50 controls the operation of the non-safety system 100, based on the operation of the non-safety control display unit 52 by the operator. In this way, the non-safety control device 10 operates and monitors the nuclear power plant at normal times.

Figure 19:
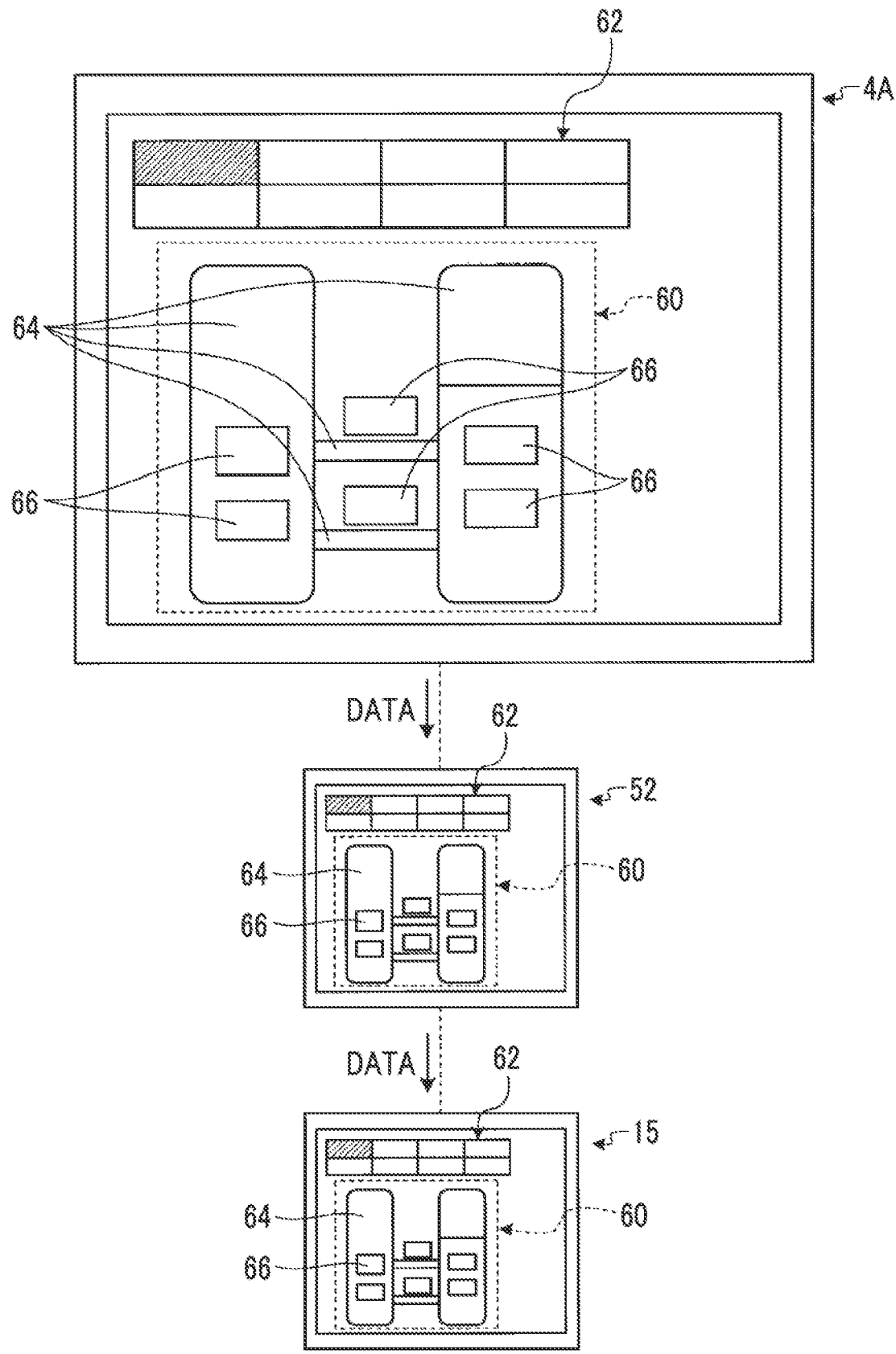
FIG. 19 is a diagram showing an example of an image displayed on a large display device, a non-safety control device, and a supervisory auxiliary display device.

FIG. 19 is a diagram showing an example of an image displayed on the large display device, the non-safety control device, and the supervisory auxiliary display device. As shown in FIG. 19, the large display panel 4A displays a main parameter image 60 and an abnormal parameter image 62. The main parameter image 60 is an image displaying the main parameter Pb in association with the relative position of the place where the main parameter Pb is detected, in the whole nuclear power plant. In the example of FIG. 19, the large display panel 4A displays a plant model image 64, which is a representation of the schematic picture of the entire nuclear power plant, and a parameter image 66, in the main parameter image 60. The parameter image 66 is an image displaying the type and value of the main parameter Pb. The parameter image 66 is an image displayed in the vicinity of the position where the main parameter Pb to be displayed is detected, in the plant model image 64. For example, the main parameter Pb on the pressure vessel is displayed in the vicinity of the picture of the pressure vessel in the plant model image 64. In this way, the large display panel 4A displays the main parameter Pb in association with the position in the nuclear power plant where the main parameter Pb is detected.

In a case where any one of the main parameters Pb is an abnormal value, the abnormal parameter image 62 represents the type of an abnormal parameter Pc which is the main parameters Pb being the abnormal value and the value or state of the abnormal parameter Pc. For example, in a case where the pressure of the pressure vessel is an abnormal value, the large display panel 4A displays "pressure of the vessel pressure" as the type of the abnormal parameter Pc and displays the value of the abnormal parameter Pc, in the abnormal parameter image 62. In a case where there are a plurality of abnormal parameters Pc, abnormal parameter image 62 represents the plurality of abnormal parameters Pc in a table form.

As shown in FIG. 19, the non-safety control display unit 52 of the non-safety control device 10 displays an initial window which is the same display as the large display panel 4A, in a state where it is not operated by the operator. The non-safety control unit 50 of the non-safety control device 10 obtains image data to be displayed on the large display panel 4A, the main parameter Pb, or the like from the large display panel control unit 4B, and displays the initial window on the non-safety control display unit 52. In addition, the initial window needs not be exactly the same display as that on the large display panel 4A as long as it displays the main parameter image 60 and the abnormal parameter image 62 in cooperation with the display on the large display panel 4A.

Further, as shown in FIG. 19, with respect to the supervisory auxiliary display device 15, the image data of the screen displayed on the non-safety control display unit 52 is output from the non-safety control unit 50, and the same image as the image displayed on the non-safety control display unit 52 is displayed. Since the supervisory auxiliary display device 15 displays exactly the same image as that of the non-safety control display unit 52, even in a case where the display on the non-safety control display unit 52 is switched to a program selection window or the like which will be described later, the supervisory auxiliary display device 15 displays the switched image. The supervisory auxiliary display device 15 does not receive the operations by the supervisor, but simply has a function of displaying an image.

Figure 20:
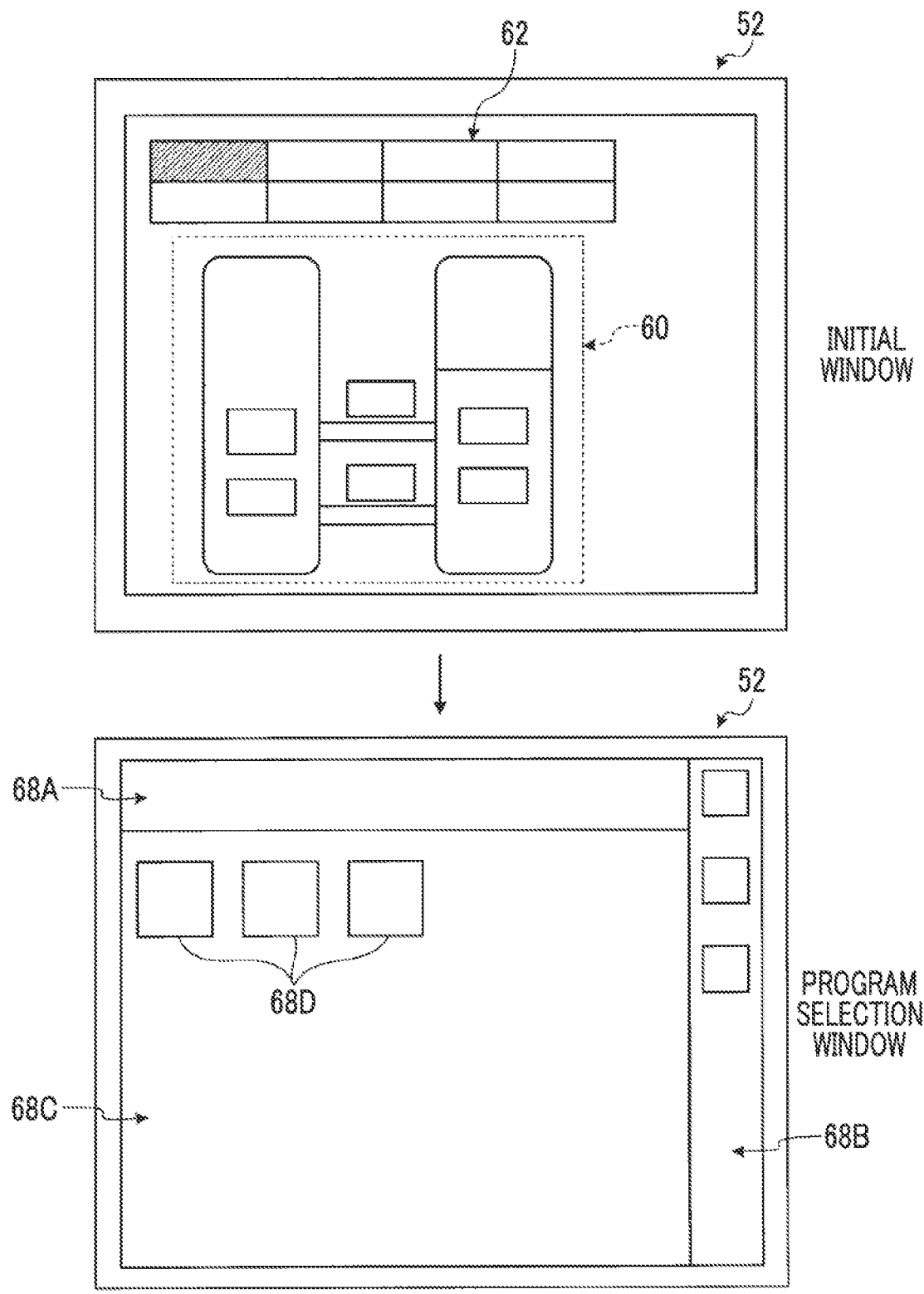
FIG. 20 is an explanatory diagram for explaining an example of a display image of the non-safety control display unit.

FIG. 20 is an explanatory diagram for explaining an example of a display image on the non-safety control display unit. In a case where any one of the main parameters Pb has an abnormal value, the non-safety control unit 50 displays the abnormal parameter image 62 in the initial window. The non-safety control unit 50 changes the display from the initial window to the program selection window, in a case where the selection of display of the abnormal parameter Pc by the worker, that is, the touch operation on the abnormal parameter image 62 is detected. The non-safety control display unit 52 displays the control program of the nuclear power plant related to the selected abnormal parameter Pc, in the program selection window. The control program of the nuclear power plant related to the selected abnormal parameter Pc is, for example, a control program for restoring the abnormal parameter Pc to a normal value.

As shown in FIG. 20, the non-safety control display unit 52 displays a title image 68A, an operation button image 68B, and a program menu image 68C in the program selection window. The title image 68A is an image displayed at the top of the screen, and displays the name (for example, "program selection window") of the program selection window. The operation button image 68B is an image displayed on the side of the screen, and displays various operation buttons. The program menu image 68C is an image displaying a plurality of program selection button images 68D. In the program selection button image 68D, the serial number or name of the corresponding control program is displayed. The program selection button image 68D is a button display on which the serial number or name is displayed and which is used for activating the control program. When detecting the selection of the control program by the operator, that is, the touch operation of the program selection button image 68D by the operator, the non-safety control unit 50 activates the control program. The operator executes the control program to perform control for returning the abnormal parameter Pc to the normal value.

In a case where there is one control program related to the abnormal parameter Pc, when a touch operation on the abnormal parameter image 62 is performed on the initial screen, the non-safety control unit 50 does not display a program selection window, but may directly activate the control program.

As described above, the plant operation monitoring system 1 according to the present embodiment includes a large display panel 4A (display panel) and a non-safety control device 10. The large display panel 4A is located at a position visible to all the workers in the main control room 2, and displays a main parameter image 60 and an abnormal parameter image 62. The main parameter image 60 is a display in which the main parameter Pb of the nuclear power plant is associated with the position in the nuclear power plant. The abnormal parameter image 62 is a display of the abnormal parameter Pc which is a parameter having an abnormal value, among main parameters Pb. The non-safety control device 10 includes a non-safety control unit 50 that controls the operation of the nuclear power plant based on the operation of the worker, and a non-safety control display unit 52 that displays an image under the control of the non-safety control unit 50. In cooperation with the display on the large display panel 4A, the non-safety control unit 50 displays an initial window displaying the main parameter image 60 and the abnormal parameter image 62 on the non-safety control display unit 52. In a case where the display of the abnormal parameter Pc in the initial window is selected by a worker, the non-safety control unit 50 activates a control program of the nuclear power plant, which is related to the abnormal parameter Pc.

For example, in a case where the non-safety control device 10 does not display the initial screen, even if the abnormal parameter Pc occurs, it takes time an inexperienced worker to determine which control program for returning the abnormal parameter Pc to a normal value is to be activated, so the burden of monitoring increases. On the other hand, according to the plant operation monitoring system 1 according to the present embodiment, in a case where the abnormal parameter Pc occurs, it is possible to activate a control program for returning the abnormal parameter Pc to the normal value, by simply selecting the display image of the abnormal parameter Pc on the screen of the initial window of the non-safety control device 10. Therefore, according to the plant operation monitoring system 1, the burden of monitoring on the worker can be reduced.

In a case where the abnormal parameter Pc, to which a plurality of the control programs are related, is selected in the initial window, the non-safety control unit 50 displays a program selection window that displays a plurality of control programs on the non-safety control display unit 52, and in a case where display of one control program is selected in the program selection window, the selected program is activated. According to the plant operation monitoring system 1, even in a case where there are a plurality of control programs related to the abnormal parameter Pc, it is possible to perform selection by focusing only on the related control program, so that the burden of monitoring on the worker can be further reduced.

The plant operation monitoring system 1 includes the supervisory control device 14 which is operated by the supervisor who supervises the worker, and the supervisory auxiliary display device 15 which is disposed adjacent to the supervisory control device 14 and displays the same display as in the non-safety control device 10. According to the plant operation monitoring system 1, the supervisory auxiliary display device 15 allows the same screen as the operation screen of the non-safety control device 10 of the worker to be visually recognized in a place where monitoring is performed. Therefore, according to the plant operation monitoring system 1, it is possible to reduce the burden of monitoring on the supervisor.

Second Embodiment

Next, a second embodiment will be described. In the plant operation monitoring system 1 according to the second embodiment, the display on a large display panel 4Aa is different from in the first embodiment. In the second embodiment, an explanation will be omitted for the units having the same configurations as in the first embodiment.

Figure 21:
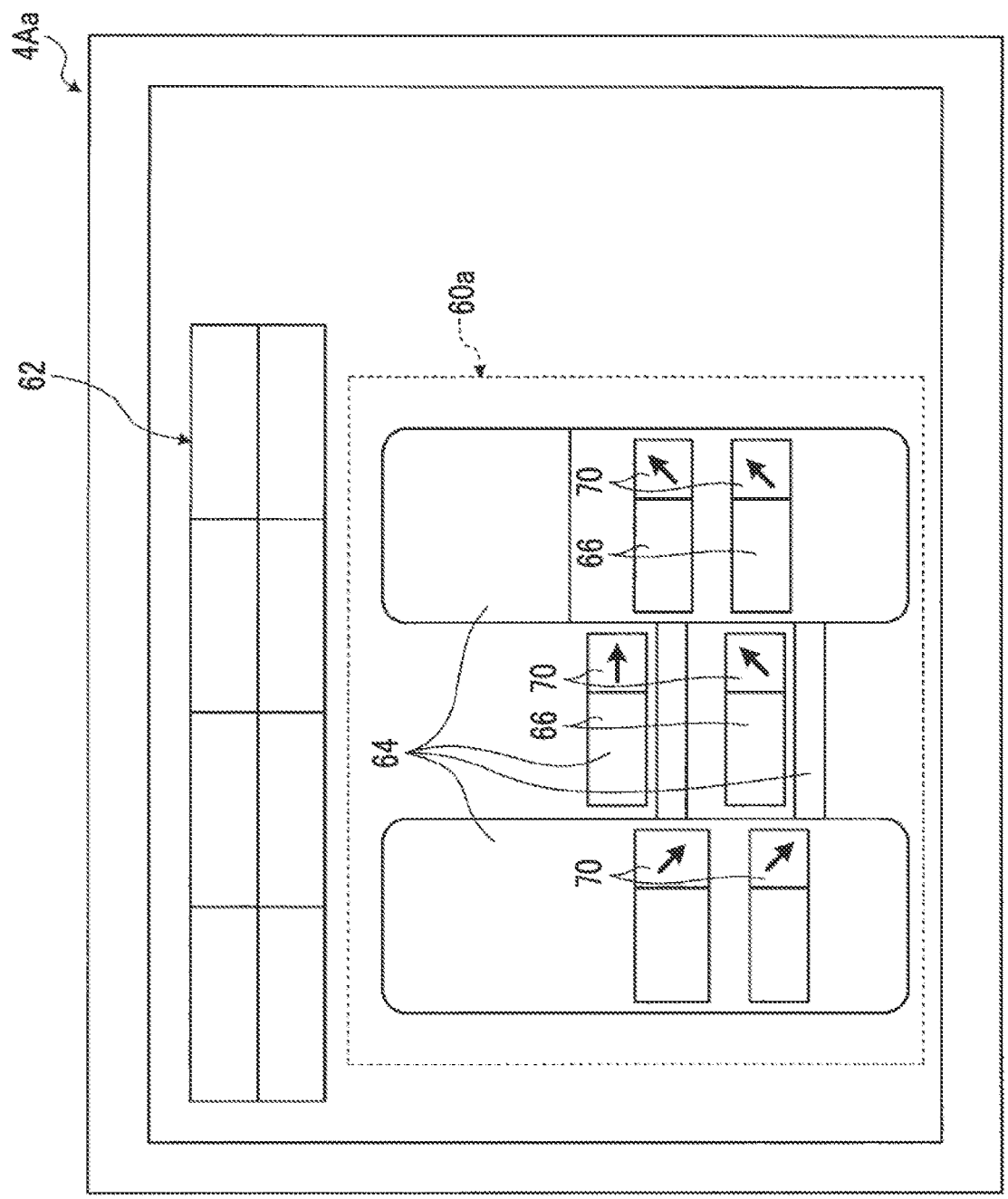
FIG. 21 is a diagram showing an example of display on a large display panel in a second embodiment.

FIG. 21 is a diagram showing an example of display on a large display panel in the second embodiment. As shown in FIG. 21, the large display panel 4Aa according to the second embodiment displays a main parameter image 60a and the abnormal parameter image 62. The large display panel 4Aa displays trend images 70 in addition to plant model images 64 and parameter images 66, in the main parameter image 60a. The trend image 70 is an image which is displayed corresponding to (in adjacent to) the parameter image 66. The trend image 70 displays a change trend indicating the trend of change of the main parameter Pb of the corresponding parameter image 66 for each time.

The change trend is detected by the large display panel control unit 4B. The large display panel control unit 4B acquires the main parameter Pb for each time, and compares the acquired value of the main parameter Pb with the value of previous main parameter Pd which is the main parameter Pb acquired at the timing before the predetermined time T to detect a change trend. In a case where the acquired value of the main parameter Pb is higher than the value of the previous main parameter Pd by a first change amount A or more, the large display panel control unit 4B displays increase information indicating that the value increases, as a trend image 70. In a case where the acquired value of the main parameter Pb is lower than the value of the previous main parameter Pd by a second change amount B or more, the large display panel control unit 4B displays increase information indicating that the value decreases, as the trend image 70. In other cases, that is, in a case where the acquired value of the main parameter Pb is not higher than the value of the previous main parameter Pd by the first change amount A or more, or is not lower than the value of the previous main parameter Pd by the second change amount B or more, the large display panel control unit 4B displays constant information indicating that the value has not changed, as the trend image 70. The large display panel control unit 4B detects a change trend every time when the main parameter Pb is newly acquired, and sequentially performs switching between an increase display, a decrease display, and a constant display.

As shown in FIG. 21, the large display panel 4Aa displays an upward arrow whose tip is inclined upwards from the horizontal direction, as the trend image 70, in a case of displaying the increase information as the trend image 70. The large display panel 4Aa displays a downward arrow whose tip is inclined towards from the horizontal direction, as the trend image 70, in a case of displaying the descending information as the trend image 70. The large display panel 4Aa displays a horizontal arrow along the horizontal direction as the trend image 70, in a case of displaying the constant information as the trend image 70. The large display panel 4Aa changes the inclination of the arrow according to the value. In other words, even for the increase information, if the difference from the value of the previous main parameter Pd is large, the tip of the upward arrow is further inclined upward, and even for the descent information, the difference from the value of the previous main parameter Pd is large, the tip of the downward arrow is further inclined downward.

Figure 22:
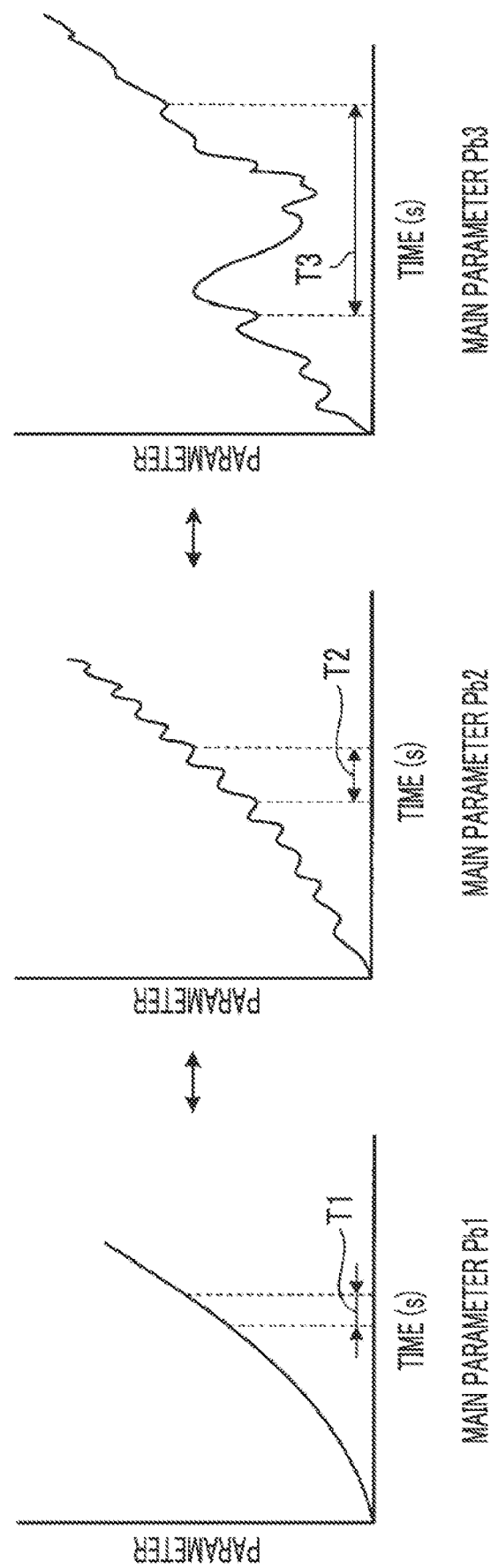
FIG. 22 is a diagram for explaining setting of a predetermined time for each parameter.

The large display panel control unit 4B sets the predetermined time T, the first change amount A, and the second change amount B, for each of the main parameters Pb. Therefore, at least one of the predetermined time T, the first change amount A, and the second change amount B has a different value for each of the main parameters Pb. FIG. 22 is a diagram for explaining setting of a predetermined time for each parameter. Each graph of FIG. 22 represents an example of a change of each main parameter Pb every time. FIG. 22 shows an example in which the main parameters Pb1, Pb2, and Pb3 are in an increase trend. With respect to the main parameter Pb1, its value does not decrease even in unit time, and steadily increases, in the increase trend. With respect to the main parameter Pb2, its value decreases even in unit time, and increases as a whole while repeating increase and decrease. With respect to the main parameter Pb3, the value increases as a whole while the value repeats increase and decrease, similar to the main parameter Pb2, but the variation thereof is not more stable than the main parameter Pb2, and there is a timing at which the value largely decreases.

As described above, in a case where the variation trends of the values of the main parameters Pb1, Pb2, and Pb3 are different from each other, the large display panel control unit 4B sets the predetermined time T1 of the main parameter Pb1, the predetermined time T2 of the main parameter Pb2, and the predetermined time T3 of the main parameter Pb3 to the values which are different from each other. For example, the large display panel control unit 4B sets the predetermined time T1 of the main parameter Pb1, of which the value variation per unit time is smallest, to be smallest, and sets the predetermined time T2 of the main parameter Pb2, of which the value variation per unit time is larger than that, to be longer than the predetermined time T1. Further, the large display panel control unit 4B maximizes the predetermined time T3 of the main parameter Pb3 of which fluctuation is not stable.

For example, the large display panel control unit 4B sets the first change amount A and the second change amount B to be small with respect to the main parameter Pb requiring strict monitoring, and sets the first change amount A and the second change amount B to be large with respect to the main parameter Pb for which a change is acceptable to some extent. In addition, the large display panel control unit 4B sets the first change amount A and the second change amount B to be the same value with respect to the same main parameter Pb.

The large display panel control unit 4B may acquire information on the allowable upper limit, the allowable lower limit, and the allowable median value of the main parameter Pb, and may divide and display the increase information into first increase information and second increase information, and divide and display the decrease information into first decrease information and second decrease information, based on the acquired value. The allowable upper limit is a value preset for each the main parameter Pb. When the value of the main parameter Pb becomes larger than the allowable upper limit, it is determined that the value is not normal and it is displayed as the abnormal parameter Pc. The allowable lower limit value is a value preset for each the main parameter Pb. When the value of the main parameter Pb becomes smaller than the allowable lower limit, it is determined that the value is not normal and it is displayed as the abnormal parameter Pc. The allowable median value is a median value between the allowable upper limit and the allowable lower limit.

Figure 23:
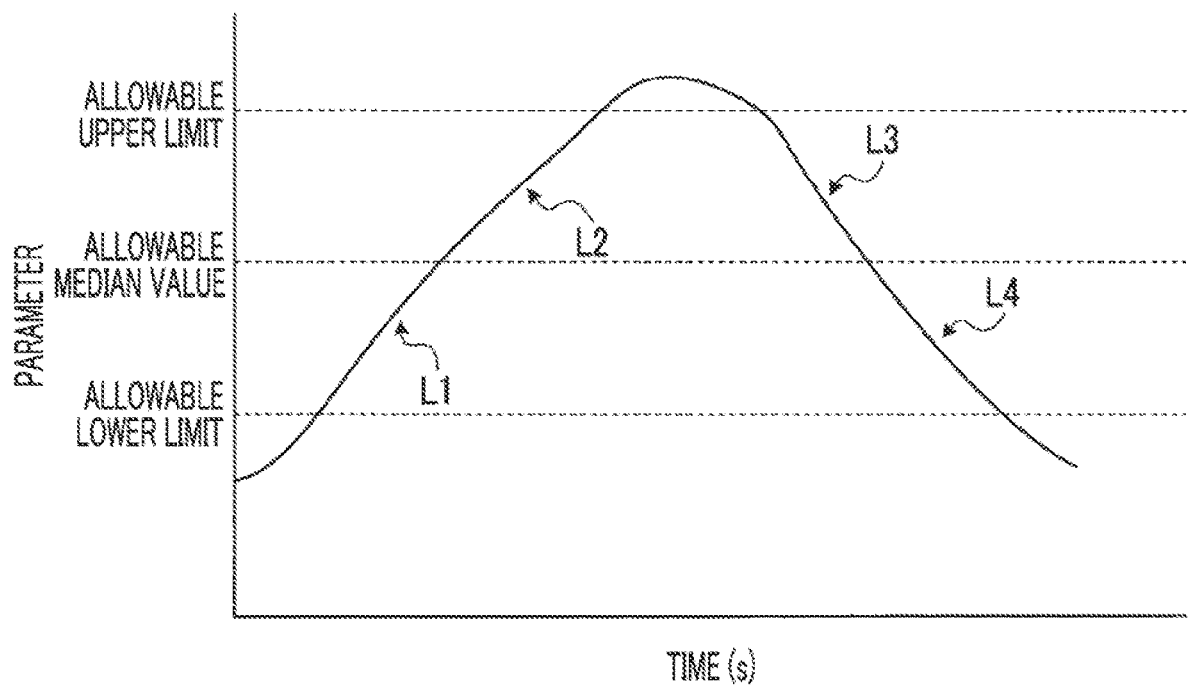
FIG. 23 is a graph for explaining increase information and decrease information.

FIG. 23 is a graph for explaining increase information and decrease information. FIG. 23 is a graph representing an example of a change of the main parameter Pb every time. The large display panel control unit 4B displays first increase information on the large display panel 4Aa, in an area L1 where the main parameter Pb is in an increase trend, that is, the increase information is displayed and the value is between an allowable lower limit and an allowable median value. The large display panel control unit 4B displays second increase information on the large display panel 4Aa, in an area L2 where the main parameter Pb is in an increase trend, that is, the increase information is displayed and the value is between an allowable median value and an allowable upper limit.

The large display panel control unit 4B displays first decrease information on the large display panel 4Aa, in an area L3 where the main parameter Pb is in a decrease trend, that is, the decrease information is displayed and the value is between the allowable median value and the allowable upper limit. The large display panel control unit 4B displays second decrease information on the large display panel 4Aa, in an area L4 where the main parameter Pb is in a decrease trend, that is, the decrease information is displayed and the value is between the allowable lower limit and the allowable median value.

The first increase information and the second increase information are upward arrows of the same slope as long as the amount of change is the same, but they may be displayed different from each other, by setting for example, a color to be displayed different. Similarly, the first decrease information and the second decrease information are downward arrows of the same slope as long as the amount of change is the same, but they may be displayed different from each other, by setting for example, a color to be displayed different. In a case where the main parameter Pb is second increase information, if the increase trend is continued as it is, a probability that exceeds the allowable upper limit is higher than the case of the first increase information. In addition, in a case where the main parameter Pb is second decrease information, if the decrease trend is continued as it is, a probability of decreasing below the allowable lower limit is higher than the case of the first decrease information. Therefore, the large display panel control unit 4B makes it easy to attract worker's attention by displaying for example, yellow for the second increase information and second decrease information.

As described above, the plant operation monitoring system 1 according to the second embodiment includes a large display panel 4Aa (display panel), and a large display panel control unit 4B that controls display on the large display panel 4Aa. The large display panel control unit 4B detects a change trend indicating a trend of a change of the main parameter Pb for each time, and displays the change trend in association with the main parameter Pb on the large display panel 4Aa.

In a case where the change trend is not displayed on the large display panel, the worker needs to integrate the values of the main parameter Pb at each point in time, and calculate the change trend. On the other hand, according to the plant operation monitoring system 1, the worker can visually recognize the trend of a change for each time only by visually recognizing the large display panel 4Aa. Therefore, according to this plant operation monitoring system 1, the change trend does not need to be calculated, and the burden of monitoring on the worker can be reduced.

Further, the large display panel control unit 4B displays increase information indicating that the value is increasing in a case where the main parameter Pb is increased by the first change amount A or more as compared with a predetermined time T before, and displays decrease information indicating that the value is decreasing in a case where the main parameter Pb is decreased by the second change amount B or more, more than before the predetermined time T. According to the plant operation monitoring system 1, since it can be checked at a glance whether the value is increasing or decreasing, it is possible to further reduce the burden of monitoring on the worker.

Further, the large display panel control unit 4B sets at least one of the predetermined time T, the first change amount A, and the second change amount B, for each of the main parameters Pb. Thus, the large display panel control unit 4B can appropriately set the change trend for each type of the main parameters Pb. Therefore, according to the plant operation monitoring system 1, it is possible to visually recognize the change trend which is more appropriately set, so it is possible to further reduce the burden of monitoring on the worker.

Further, the large display panel control unit 4B acquires information on the allowable upper limit, the allowable lower limit, and the allowable median value of the main parameter Pb. In a case of displaying the increase information, the large display panel control unit 4B displays first increase information in a case where the main parameter Pb is between the allowable lower limit and the allowable median value, and displays second increase information in a case where the main parameter Pb is between the allowable median value and the allowable upper limit. In a case of displaying the decrease information, the large display panel control unit 4B displays first decrease information in a case where the main parameter Pb is between the allowable median value and the allowable upper limit, and displays second increase information in a case where the main parameter Pb is between the allowable lower limit and the allowable median value. The possibility that the main parameter Pb is out of the range of the allowable upper limit or the allowable lower limit is higher in the case of the second increase information and the second decrease information than in the case of the first increase information and the first decrease information. Therefore, according to the plant operation monitoring system 1, it is easier to attract workers' attention by displaying them differently, so it is possible to further reduce the burden of monitoring on the worker.

Although the embodiments of the present invention have been described above, the embodiments are not limited by the contents of the embodiments. In addition, the above-described constituent elements include those easily assumed by those skilled in the art, substantially the same ones, and so-called equivalents. Further, the above-described constituent elements can be appropriately combined. Furthermore, various omissions, substitutions or modification of constituent elements can be made without departing from the gist of the above-mentioned embodiments.

REFERENCE SIGNS LIST

1 OPERATION MONITORING SYSTEM
2 MAIN CONTROL ROOM
4 LARGE DISPLAY DEVICE
4A LARGE DISPLAY PANEL (DISPLAY PANEL)
4B LARGE DISPLAY PANEL CONTROL UNIT
6 NON-SAFETY CONTROL SYSTEM
7 SUPERVISORY CONTROL SYSTEM
8 SAFETY CONTROL AND MONITORING SYSTEM
10 NON-SAFETY CONTROL DEVICE
12 COMPUTER-BASED PROCEDURE DISPLAY DEVICE
14 SUPERVISORY CONTROL DEVICE
15 SUPERVISORY AUXILIARY DISPLAY DEVICE
16 SAFETY CONTROL SYSTEM
17 SAFETY CONTROL DEVICE
18 SAFETY PARAMETER MONITORING SYSTEM
19 SAFETY PARAMETER MONITOR DEVICE
20 SAFETY CONTROL UNIT
21 SAFETY DISPLAY UNIT
22 SAFETY MONITOR CONTROL UNIT
24 SAFETY OPERATION UNIT
25 TASK-BASED CONTROL UNIT
26 SAFETY PARAMETER DISPLAY CONTROL UNIT
27 SAFETY PARAMETER DISPLAY UNIT
28 PARALLEL PARAMETER MONITOR CONTROL UNIT
29 TASK-BASED PARAMETER MONITOR CONTROL UNIT
100 NON-SAFETY SYSTEM
110 SAFETY SYSTEM
111 SAFETY DEVICE

The invention claimed is:

1. A nuclear-power-plant safety control and monitoring system which is disposed in a main control room of a nuclear power plant including a plurality of safety devices which are used when abnormality occurs, and have the same function as each other, comprising:
a parallel parameter monitor control unit that displays safety parameters which are current values of the parameters of the safety device, for each type of the safety parameters and for each of the plurality of safety devices, side by side; and
a task-based parameter monitor control unit that displays the safety parameters, for each step of an emergency operation procedure which is a procedure for leading to a safe state and for each of the plurality of safety devices, side by side, wherein
the parallel parameter monitor control unit distinguishes and displays a safety parameter that does not have a normal value or is not in a normal state from a normal safety parameter, among the safety parameters,
a second procedure window is opened up side-by-side with a display of procedure steps relating to a computer-based procedure in which a step selected by an operator for at least one of the safety parameters is described, and
at least one side of the side-by-side display of the procedure steps includes a title image, a comment image, an action image, a parameter image, a backup action image, and an operation button image.

2. The nuclear-power-plant safety control and monitoring system according to claim 1, further comprising:
a safety parameter monitor device including the task-based parameter monitor control unit, and a safety parameter display unit that displays the safety parameters under the control of the task-based parameter monitor control unit; and
a safety control device including a task-based control unit that controls the operation of each unit of the safety device when executing the emergency operation procedure,
wherein the task-based parameter monitor control unit displays parameters of a safety device related to a procedure step of an emergency operation procedure executed by the task-based control unit as the safety parameters, on the safety parameter display unit.

* * * * *